US008989433B2

(12) United States Patent
Kasuya et al.

(10) Patent No.: US 8,989,433 B2
(45) Date of Patent: Mar. 24, 2015

(54) PAPER SHEET RECOGNITION APPARATUS AND PAPER SHEET RECOGNITION METHOD

(75) Inventors: Tomohiko Kasuya, Hyogo (JP); Kazuhiro Ohmatsu, Hyogo (JP); Hiroki Hamasaki, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 260 days.

(21) Appl. No.: 13/497,583

(22) PCT Filed: Sep. 24, 2009

(86) PCT No.: PCT/JP2009/066542
§ 371 (c)(1),
(2), (4) Date: Mar. 22, 2012

(87) PCT Pub. No.: WO2011/036748
PCT Pub. Date: Mar. 31, 2011

(65) Prior Publication Data
US 2012/0275644 A1 Nov. 1, 2012

(51) Int. Cl.
*G06K 9/00* (2006.01)
*G07D 7/12* (2006.01)
*G07D 7/00* (2006.01)

(52) U.S. Cl.
CPC .................. *G07D 7/121* (2013.01); *G07D 7/00* (2013.01); *G07D 7/0006* (2013.01)
USPC .......................................................... 382/100

(58) Field of Classification Search
CPC ........................................................ G06K 9/00
USPC ........................................................ 382/100
See application file for complete search history.

(56) References Cited

U.S. PATENT DOCUMENTS 6,234,294 B1 5/2001 Defeo et al.
2005/0201609 A1* 9/2005 Nakamura et al. ............ 382/135
2007/0018382 A1* 1/2007 Mukai ...................... 271/258.01
2008/0236990 A1* 10/2008 Ehrich et al. .................. 194/207
2008/0283451 A1* 11/2008 Holl et al. ..................... 209/534
2009/0184034 A1* 7/2009 Doi et al. ...................... 209/534

FOREIGN PATENT DOCUMENTS

JP 53-72694 6/1978
JP 59-160284 9/1984
JP 2002-373365 12/2002

OTHER PUBLICATIONS

European Search Report (Application No. 09849779.5—PCT/2009/066542) (6 pages—dated Mar. 26, 2013).

* cited by examiner

*Primary Examiner* — Stephen R Koziol
*Assistant Examiner* — Delomia Gilliard
(74) *Attorney, Agent, or Firm* — Renner, Kenner, Greive, Bobak, Taylor & Weber

(57) ABSTRACT

Provided is a paper sheet recognition device for recognizing a fitness and authenticity of paper sheets, by which recognition of types, authenticity, and fitness of paper sheets can be effectively performed even in the case where a large number of features should be evaluated. The paper sheet recognition device is provided with a paper sheet information acquisition unit which acquires paper sheet information which is the information relating to paper sheets, a type recognition unit which recognizes the types of the paper sheets on the basis of the paper sheet information, a fitness recognition unit which recognizes fitness of the paper sheets on the basis of the paper sheet information, and an authenticity recognition unit which recognizes the authenticity of the paper sheets on the basis of the paper sheet information, wherein the fitness recognition process of the paper sheets by the fitness recognition unit and the authenticity recognition process of the paper sheets by the authenticity recognition unit are performed in parallel.

8 Claims, 14 Drawing Sheets

| | CONTROL OF DENOMINATION RECOGNITION PROCESS | CONTROL OF AUTHENTICITY RECOGNITION PROCESS | CONTROL OF FITNESS RECOGNITION PROCESS |
|---|---|---|---|
| PATTERN 1 | CPU(1) | CPU(1) | CPU(2) |
| PATTERN 2 | CPU(1) | CPU(2) | CPU(1) |
| PATTERN 3 | CPU(1) | CPU(2) | CPU(2) |
| PATTERN 4 | CPU(1) | CPU(2) | CPU(3) |

FIG.3C

| | CONTROL OF FIRST FITNESS RECOGNITION PROCESS | CONTROL OF FIRST AUTHENTICITY RECOGNITION PROCESS | CONTROL OF SECOND FITNESS RECOGNITION PROCESS | CONTROL OF SECOND AUTHENTICITY RECOGNITION PROCESS |
|---|---|---|---|---|
| PATTERN 5 | CPU(1) | CPU(1) | CPU(2) | CPU(2) |
| PATTERN 6 | CPU(1) | CPU(2) | CPU(1) | CPU(2) |
| PATTERN 7 | CPU(1) | CPU(2) | CPU(2) | CPU(1) |
| PATTERN 8 | CPU(1) | CPU(1) | CPU(1) | CPU(2) |
| PATTERN 9 | CPU(1) | CPU(1) | CPU(2) | CPU(1) |
| PATTERN 10 | CPU(1) | CPU(2) | CPU(1) | CPU(1) |
| PATTERN 11 | CPU(2) | CPU(1) | CPU(1) | CPU(1) |
| PATTERN 12 | CPU(1) | CPU(1) | CPU(2) | CPU(3) |
| PATTERN 13 | CPU(1) | CPU(2) | CPU(1) | CPU(3) |
| PATTERN 14 | CPU(1) | CPU(2) | CPU(3) | CPU(1) |
| PATTERN 15 | CPU(1) | CPU(2) | CPU(2) | CPU(3) |
| PATTERN 16 | CPU(1) | CPU(2) | CPU(3) | CPU(2) |
| PATTERN 17 | CPU(1) | CPU(3) | CPU(2) | CPU(2) |
| PATTERN 18 | CPU(1) | CPU(2) | CPU(3) | CPU(4) |

FIG.3D

| | CONTROL OF OPTICAL LINE SENSOR PROCESS | CONTROL OF OTHER SENSOR PROCESS | CONTROL OF FPGA |
|---|---|---|---|
| PATTERN 19 | CPU(1) | CPU(2) | — |
| PATTERN 20 | FPGA(1) | CPU(2) | CPU(2) |
| PATTERN 21 | FPGA(1) | CPU(2) | CPU(3) |
| PATTERN 22 | CPU(1) | CPU(2) | CPU(1) |
| PATTERN 23 | CPU(1) | CPU(2) | CPU(3) |
| PATTERN 24 | CPU(1)<br>FPGA(1)(SCRIBBLE)<br>FPGA(2)(SERIAL NUMBER) | CPU(2) | CPU(3) |
| PATTERN 25 | CPU(1)<br>FPGA(1)(SCRIBBLE)<br>FPGA(2)(SERIAL NUMBER) | CPU(2) | CPU(1) |
| PATTERN 26 | CPU(1)<br>FPGA(1)(SCRIBBLE)<br>FPGA(2)(SERIAL NUMBER) | CPU(2) | CPU(2) |
| PATTERN 27 | CPU(1) | CPU(2)<br>FPGA(1)<br>FPGA(2) | CPU(3) |
| PATTERN 28 | CPU(1) | CPU(2)<br>FPGA(1)<br>FPGA(2) | CPU(1) |
| PATTERN 29 | CPU(1) | CPU(2)<br>FPGA(1)<br>FPGA(2) | CPU(2) |

FIG.3E

| | CONTROL OF FIRST DENOMINATION RECOGNITION PROCESS | CONTROL OF FIRST AUTHENTICITY RECOGNITION PROCESS | CONTROL OF SECOND DENOMINATION RECOGNITION PROCESS | CONTROL OF SECOND AUTHENTICITY RECOGNITION PROCESS |
|---|---|---|---|---|
| PATTERN 30 | CPU(1) | CPU(1) | CPU(2) | CPU(2) |
| PATTERN 31 | CPU(1) | CPU(2) | CPU(1) | CPU(2) |
| PATTERN 32 | CPU(1) | CPU(2) | CPU(2) | CPU(1) |
| PATTERN 33 | CPU(1) | CPU(1) | CPU(1) | CPU(2) |
| PATTERN 34 | CPU(1) | CPU(1) | CPU(2) | CPU(1) |
| PATTERN 35 | CPU(1) | CPU(2) | CPU(1) | CPU(1) |
| PATTERN 36 | CPU(2) | CPU(1) | CPU(1) | CPU(1) |
| PATTERN 37 | CPU(1) | CPU(1) | CPU(2) | CPU(3) |
| PATTERN 38 | CPU(1) | CPU(2) | CPU(1) | CPU(3) |
| PATTERN 39 | CPU(1) | CPU(2) | CPU(3) | CPU(1) |
| PATTERN 40 | CPU(1) | CPU(2) | CPU(2) | CPU(3) |
| PATTERN 41 | CPU(1) | CPU(2) | CPU(3) | CPU(2) |
| PATTERN 42 | CPU(1) | CPU(3) | CPU(2) | CPU(2) |
| PATTERN 43 | CPU(1) | CPU(2) | CPU(3) | CPU(4) |

PAPER SHEET RECOGNITION APPARATUS AND PAPER SHEET RECOGNITION METHOD

TECHNICAL FIELD

The present invention relates to a paper sheet recognition apparatus and a paper sheet recognition method for recognizing a type, an authenticity, or a fitness of a paper sheet, such as a banknote, and particularly relates to a paper sheet recognition apparatus and a paper sheet recognition method capable of efficiently performing recognition processes of the paper sheet even if a large number of kinds of features to be evaluated.

BACKGROUND ART

Technologies for recognizing a denomination, an authenticity, and a fitness of a paper sheet such as a banknote that is a valuable security, are well known in the art. One such technology (for example, Patent Document 1) is explained below as an example. A deposit money recognition unit performs recognition of the denomination, fitness, and authenticity of deposited banknotes and detects whether there occurs any transport error. The banknotes that have been determined to be fit notes and unfit notes are stored in a safe based on the denomination. The number of fit notes and unfit notes in each denomination, and their ratios are acquired and stored as fitness information. Upon request of a withdrawal transaction, the banknotes are fed out from the safe as per the requirement, a fitness recognition is performed by a dispensing money recognition unit, the notes that are determined to be fit notes are dispensed, and the notes that are determined to be unfit notes are stored in a dispensing reject bin.

In view of increase of counterfeit paper sheets such as banknotes in recent years, the banknotes are provided with, as a preventive measure against counterfeit forgery, security information in the form of including magnetic characteristics or a magnetic thread in the banknote, printing the banknote in a fluorescent ink, or embedding a hologram onto the banknote. Availability of sophisticated copying machines and scanners has enabled forgery of counterfeit paper sheets. Technological development is ongoing to counter this kind of fraud.

CONVENTIONAL ART DOCUMENTS

Patent Documents

[Patent Document 1] Japanese Patent Application Laid-open No. 2002-373365

DISCLOSURE OF INVENTION

Problem to be Solved by the Invention

However, with the increase in the amount of the security information the paper sheet is provided, a considerable amount of processing time is required for an authenticity recognition of the paper sheet. Furthermore, a high-precision recognition using an image line sensor, etc., is needed for performing a denomination recognition; this again requires a considerable amount of processing time. Furthermore, in the fitness recognition of the banknote, the fitness of the banknote needs to be determined in terms of various features, such as soiling, loss of a part of the banknote, and a tape being stuck to the banknote. Also, there is a requirement of an even more high-precision fitness recognition; this again requires a considerable amount of processing time.

As shown in FIG. 9, in a conventional technology, a denomination recognition of the banknote is performed first (Step S500), followed by an authenticity recognition of the banknote (Step S510), followed by a fitness recognition of the banknote (Step S520). Because these steps are performed one after another, process efficiency is poor. FIG. 9 is a flowchart of conventional recognition processes performed for recognition of the denomination, authenticity, and fitness.

The present invention is made in view of the above-mentioned problems, and it is an object of the present invention to provide a paper sheet recognition apparatus and a paper sheet recognition method capable of efficiently performing recognition of the denomination, authenticity, and fitness of the paper sheet even if a large number of kinds of the features to be evaluated.

Means to Solve the Problems

To solve the above problems and to achieve the above objects, a paper sheet recognition apparatus according to an aspect of the present invention that performs recognition of a paper sheet includes a paper sheet information acquiring unit that acquires paper sheet information that is information relating to the paper sheet; a type recognition unit that performs recognition of a type of the paper sheet based on the paper sheet information; a fitness recognition unit that performs recognition of a fitness of the paper sheet based on the paper sheet information; and an authenticity recognition unit that performs recognition of an authenticity of the paper sheet based on the paper sheet information. A recognition process of the fitness of the paper sheet performed by the fitness recognition unit and a recognition process of the authenticity of the paper sheet performed by the authenticity recognition unit are performed in parallel.

In the paper sheet recognition apparatus according to another aspect of the present invention, in the paper sheet recognition apparatus according to the above aspect, a recognition process of the type of the paper sheet performed by the type recognition unit is further performed in parallel with the recognition process of the fitness of the paper sheet performed by the fitness recognition unit and the recognition process of the authenticity of the paper sheet performed by the authenticity recognition unit that are performed in parallel.

In the paper sheet recognition apparatus according to another aspect of the present invention, in the paper sheet recognition apparatus according to the above aspects, the recognition process of the type of the paper sheet performed by the type recognition unit includes a plurality of recognition processes of the type, and at least one of the plurality of the recognition processes of the type of the paper sheet performed by the type recognition unit is further performed in parallel with the recognition process of the fitness of the paper sheet performed by the fitness recognition unit and the recognition process of the authenticity of the paper sheet performed by the authenticity recognition unit that are performed in parallel.

In the paper sheet recognition apparatus according to another aspect of the present invention, in the paper sheet recognition apparatus according to the above aspects, the recognition process of the fitness of the paper sheet performed by the fitness recognition unit includes a plurality of recognition processes of the fitness, the recognition process of the authenticity of the paper sheet performed by the authenticity recognition unit includes a plurality of recognition processes of the authenticity, and at least one of the plurality of the recognition processes of the fitness of the paper sheet performed by the fitness recognition unit and at least one of the plurality of the recognition processes of the authenticity of the paper sheet performed by the authenticity recognition unit are performed in parallel.

In the paper sheet recognition apparatus according to another aspect of the present invention, in the paper sheet recognition apparatus according to the above aspects, the paper sheet information acquiring unit further includes an image acquiring unit that acquires an image of the paper sheet, and a feature information acquiring unit that acquires feature information that is information relating to a feature at a specific position of the paper sheet. Among the plurality of the recognition processes of the fitness of the paper sheet performed by the fitness recognition unit, at least one recognition process of the fitness of the paper sheet is performed based on the image acquired by the image acquiring unit, and at least one recognition process of the fitness of the paper sheet is performed based on the feature information acquired by the feature information acquiring unit. Among the plurality of the recognition processes of the authenticity of the paper sheet performed by the authenticity recognition unit, at least one recognition process of the authenticity of the paper sheet is performed based on the image acquired by the image acquiring unit, and at least one recognition process of the authenticity of the paper sheet is performed based on the feature information acquired by the feature information acquiring unit.

A paper sheet recognition apparatus according to another aspect of the present invention that performs recognition of a paper sheet includes a paper sheet information acquiring unit that acquires paper sheet information that is information relating to the paper sheet; a type recognition unit that performs recognition of a type of the paper sheet based on the paper sheet information; and a fitness recognition unit that performs recognition of a fitness of the paper sheet based on the paper sheet information. A recognition process of the type of the paper sheet performed by the type recognition unit and a recognition process of the fitness of the paper sheet performed by the fitness recognition unit are performed in parallel.

In the paper sheet recognition apparatus according to another aspect of the present invention, in the paper sheet recognition apparatus according to the above aspect, the recognition process of the type of the paper sheet performed by the type recognition unit includes a plurality of recognition processes of the type, and at least one of the plurality of the recognition processes of the type of the paper sheet performed by the type recognition unit is performed in parallel with the recognition process of the fitness of the paper sheet performed by the fitness recognition unit.

In the paper sheet recognition apparatus according to another aspect of the present invention, in the paper sheet recognition apparatus according to the above aspects, the recognition process of the fitness of the paper sheet performed by the fitness recognition unit includes a plurality of recognition processes of the fitness, and at least one of the plurality of the recognition processes of the fitness of the paper sheet performed by the fitness recognition unit is performed in parallel with the recognition process of the type of the paper sheet performed by the type recognition unit.

In the paper sheet recognition apparatus according to another aspect of the present invention, in the paper sheet recognition apparatus according to the above aspects, the paper sheet information acquiring unit further includes an image acquiring unit that acquires an image of the paper sheet, and a feature information acquiring unit that acquires feature information that is information relating to a feature at a specific position of the paper sheet. Among the plurality of the recognition processes of the fitness of the paper sheet performed by the fitness recognition unit, at least one recognition process of the fitness of the paper sheet is performed based on the image acquired by the image acquiring unit, and at least one recognition process of the fitness of the paper sheet is performed based on the feature information acquired by the feature information acquiring unit.

A paper sheet recognition apparatus according to another aspect of the present invention that performs recognition of a paper sheet includes a paper sheet information acquiring unit that acquires paper sheet information that is information relating to the paper sheet; a type recognition unit that performs recognition of a type of the paper sheet based on the paper sheet information; and an authenticity recognition unit that performs recognition of an authenticity of the paper sheet based on the paper sheet information. A recognition process of the type of the paper sheet performed by the type recognition unit and a recognition process of the authenticity of the paper sheet performed by the authenticity recognition unit are performed in parallel.

In the paper sheet recognition apparatus according to another aspect of the present invention, in the paper sheet recognition apparatus according to the above aspect, the recognition process of the type of the paper sheet performed by the type recognition unit includes a plurality of recognition processes of the type, and at least one of the plurality of the recognition processes of the type of the paper sheet performed by the type recognition unit is performed in parallel with the recognition process of the authenticity of the paper sheet performed by the authenticity recognition unit.

In the paper sheet recognition apparatus according to another aspect of the present invention, in the paper sheet recognition apparatus according to the above aspects, the recognition process of the authenticity of the paper sheet performed by the authenticity recognition unit includes a plurality of recognition processes of the authenticity, and at least one of the plurality of the recognition processes of the authenticity of the paper sheet performed by the authenticity recognition unit is performed in parallel with the recognition process of the type of the paper sheet performed by the type recognition unit.

In the paper sheet recognition apparatus according to another aspect of the present invention, in the paper sheet recognition apparatus according to the above aspects, the paper sheet information acquiring unit further includes an image acquiring unit that acquires an image of the paper sheet, and a feature information acquiring unit that acquires feature information that is information relating to a feature at a specific position of the paper sheet. Among the plurality of the recognition processes of the authenticity of the paper sheet performed by the authenticity recognition unit, at least one recognition process of the authenticity of the paper sheet is performed based on the image acquired by the image acquiring unit, and at least one recognition process of the authenticity of the paper sheet is performed based on the feature information acquired by the feature information acquiring unit.

Advantages of the Invention

According to an aspect of the present invention, a paper sheet recognition apparatus acquires paper sheet information that is information relating to a paper sheet, and based on the paper sheet information, performs recognition of a type of the paper sheet, recognition of a fitness of the paper sheet, and recognition of an authenticity of the paper sheet, performing a recognition process of the fitness of the paper sheet and a recognition process of the authenticity of the paper sheet in parallel. Consequently, even if the number of kinds of features is large, the paper sheet recognition apparatus can efficiently perform the recognition of the type, the authenticity, and the fitness of the paper sheet.

Furthermore, according to another aspect of the present invention, in the above paper sheet recognition apparatus, a recognition process of the type of the paper sheet is further performed in parallel with the concurrent processes of the recognition process of the fitness of the paper sheet and the recognition process of the authenticity of the paper sheet. Consequently, the recognition of the type, the authenticity, and the fitness of the paper sheet can be performed efficiently in a short time.

Furthermore, according to still another aspect of the present invention, in the above paper sheet recognition apparatus, the recognition process of the type of the paper sheet includes a plurality of recognition processes. At least one of the plurality of the recognition processes of the type of the paper sheet is further performed in parallel with the concurrent processes of the recognition process of the fitness of the paper sheet and the recognition process of the authenticity of the paper sheet. Consequently, the recognition of the type, the authenticity, and the fitness of the paper sheet can be performed efficiently in a short time.

Furthermore, according to still another aspect of the present invention, in the above paper sheet recognition apparatus, the recognition process of the fitness of the paper sheet includes a plurality of recognition processes of the fitness, the recognition process of the authenticity of the paper sheet includes a plurality of recognition processes of the authenticity, and at least one of the plurality of the recognition processes of the fitness of the paper sheet and at least one of the plurality of the recognition processes of the authenticity of the paper sheet are performed in parallel. Consequently, the recognition processes of the authenticity and the fitness of the paper sheet can be performed efficiently in a short time.

Furthermore, according to still another aspect of the present invention, the paper sheet recognition apparatus acquires an image of the paper sheet and feature information that is information relating to a feature in a specific position of the paper sheet. In the paper sheet recognition apparatus, among the plurality of the recognition processes of the fitness of the paper sheet, at least one recognition process of the fitness of the paper sheet is performed based on the image acquired by the paper sheet recognition apparatus, and at least one recognition process of the fitness of the paper sheet is performed based on the feature information acquired by the paper sheet recognition apparatus, and among the plurality of the recognition processes of the authenticity of the paper sheet, at least one recognition process of the authenticity of the paper sheet is performed based on the image acquired by the paper sheet recognition apparatus, and at least one recognition process of the authenticity of the paper sheet is performed based on the feature information acquired by the paper sheet recognition apparatus. Consequently, the recognition of the type, the fitness, and the authenticity of the paper sheet can be performed efficiently in a short time based on optical image information of the paper sheet.

Furthermore, according to still another aspect of the present invention, the paper sheet recognition apparatus acquires the paper sheet information that is the information relating to a paper sheet, and based on the paper sheet information, performs the recognition of the type of the paper sheet and the recognition of the fitness of the paper sheet, performing the recognition processes of the type of the paper sheet and the fitness of the paper sheet in parallel. Consequently, the paper sheet recognition apparatus can efficiently perform the recognition of the type and the fitness of the paper sheet in a short time.

Furthermore, according to still another aspect of the present invention, in the above paper sheet recognition apparatus, the recognition process of the type of the paper sheet includes a plurality of recognition processes of the type, and at least one of the plurality of the recognition processes of the type of the paper sheet is performed in parallel with the recognition process of the fitness of the paper sheet. Consequently, the recognition of the type and the fitness of the paper sheet can be efficiently performed in a short time.

Furthermore, according to still another aspect of the present invention, in the paper sheet recognition apparatus, the recognition process of the fitness of the paper sheet includes a plurality of recognition processes of the fitness, and at least one of the plurality of the recognition processes of the fitness of the paper sheet is performed in parallel with the recognition process of the type of the paper sheet performed by the type recognition unit. Consequently, the recognition of the type and the fitness of the paper sheet can be efficiently performed in a short time.

Furthermore, according to still another aspect of the present invention, the paper sheet recognition apparatus acquires the image of the paper sheet and the feature information that is the information relating to a feature in a specific position of the paper sheet. In the paper sheet recognition apparatus, among the plurality of the recognition processes of the fitness of the paper sheet, at least one recognition process of the fitness of the paper sheet is performed based on the image acquired by the paper sheet recognition apparatus, and at least one recognition process of the fitness of the paper sheet is performed based on the feature information acquired by the paper sheet recognition apparatus. Consequently, the recognition of the type and the fitness of the paper sheet can be efficiently performed in a short time based on the optical image information of the paper sheet.

Furthermore, according to still another aspect of the present invention, the paper sheet recognition apparatus acquires the paper sheet information that is the information relating to a paper sheet, and based on the paper sheet information, performs the recognition of the type of the paper sheet and the recognition of the authenticity of the paper sheet, performing the recognition processes of the type of the paper sheet and the authenticity of the paper sheet in parallel. Consequently, the paper sheet recognition apparatus can efficiently perform the recognition of the type and the authenticity of the paper sheet in a short time.

Furthermore, according to still another aspect of the present invention, in the paper sheet recognition apparatus, the recognition process of the type of the paper sheet includes a plurality of recognition processes of the type, and at least one of the plurality of the recognition processes of the type of the paper sheet is performed in parallel with the recognition process of the authenticity of the paper sheet. Consequently, the recognition of the type and the authenticity of the paper sheet can be efficiently performed in a short time.

Furthermore, according to still another aspect of the present invention, in the paper sheet recognition apparatus, the recognition process of the authenticity of the paper sheet includes a plurality of recognition processes of the authenticity, and at least one of the plurality of the recognition processes of the authenticity of the paper sheet is performed in parallel with the recognition process of the type of the paper sheet. Consequently, the recognition of the type and the authenticity of the paper sheet can be efficiently performed in a short time.

Furthermore, according to still another aspect of the present invention, the paper sheet recognition apparatus acquires the image of the paper sheet and the feature information that is the information relating to a feature in a specific position of the paper sheet. In the paper sheet recognition apparatus, among the plurality of the recognition processes of the authenticity of the paper sheet, at least one recognition process of the authenticity of the paper sheet is performed based on the image acquired by the paper sheet recognition apparatus, and at least one recognition process of the authenticity of the paper sheet is performed based on the feature information acquired by the paper sheet recognition apparatus. Consequently, the recognition of the type and the authenticity of the paper sheet can be efficiently performed in a short time based on the optical image information of the paper sheet.

BRIEF DESCRIPTION OF DRAWINGS

FIG. 3C is a table showing configuration patterns of the control units in the recognition unit that perform control of a first fitness recognition process, a second fitness recognition process, a first authenticity recognition process, and a second authenticity recognition process.

FIG. 3D is a table showing configuration patterns of the control units in the recognition unit that perform control of optical line sensor processes and other sensor processes.

FIG. 3E is a table showing configuration patterns of the control units in the recognition unit that perform control of a first denomination recognition process, the first authenticity recognition process, a second denomination recognition process, and the second authenticity recognition process.

BEST MODE(S) FOR CARRYING OUT THE INVENTION

Exemplary embodiments of a paper sheet recognition apparatus and a paper sheet recognition method according to the present invention are explained in detail below with reference to the accompanying drawings. In the following explanation, a banknote is presented as an example of a paper sheet. The present invention in its broader aspects is not limited to the specific details and representative embodiments shown and explained herein. Accordingly, various modifications may be made without departing from the spirit or scope of the general inventive concept as defined by the accompanying claims and their equivalents.

Embodiment

Figure 1:
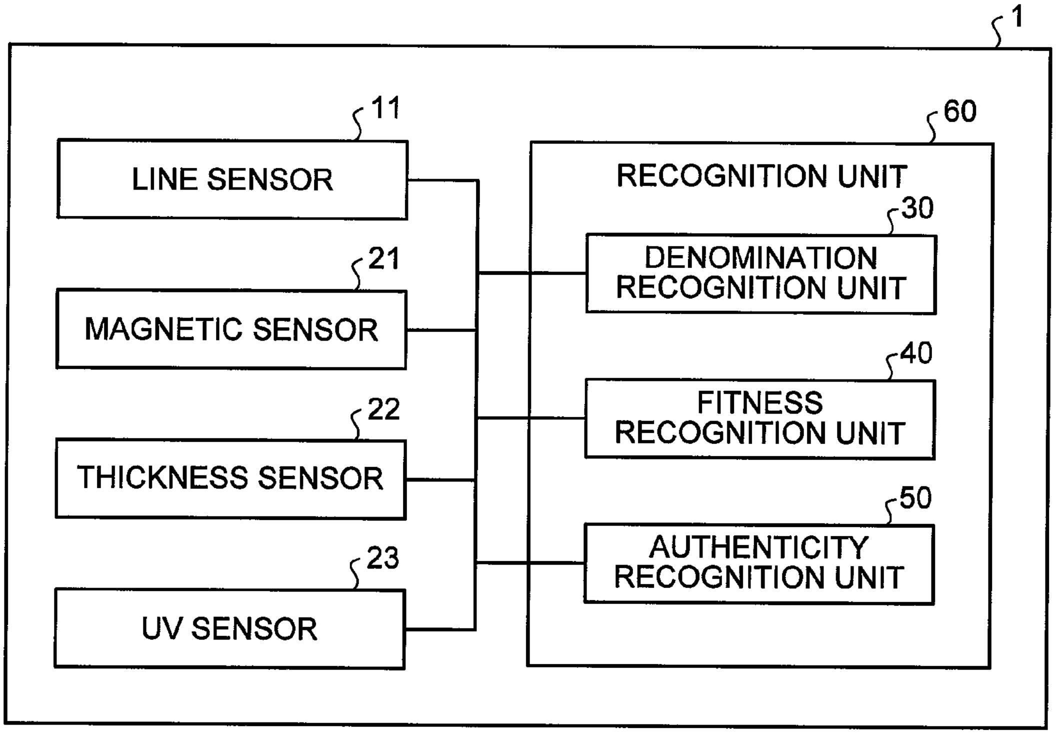
FIG. 1 is a block diagram of a banknote recognition apparatus that is a paper sheet recognition apparatus according to an embodiment of the present invention.

FIG. 1 is a block diagram of a banknote recognition apparatus 1, which is an example of a paper sheet recognition apparatus, according to an embodiment of the present invention. The banknote recognition apparatus 1 according to the present embodiment includes a line sensor 11, a magnetic sensor 21, a thickness sensor 22, a UV sensor 23, and a recognition unit 60.

The line sensor 11 is a device for acquiring an image of a banknote, and includes image line sensors. The line sensor 11, for example, includes a plurality of image line sensors, such as an LED array or a photodiode array, that are arranged at predetermined positions on a not shown banknote transport path, orthogonal to a transport direction of the banknote. The line sensor 11 that includes the image line sensors having such optical image line sensors scans a surface of the banknote being transported, and detects a distribution of physical quantities, such as a reflected light and a transmitted light, at various positions on the banknote. In the present embodiment, the optical image line sensor that includes both a transmissive sensor and a reflective sensor is presented as an example. Other than the optical image line sensors, a magnetic image line sensor can also be used.

Figure 2A:
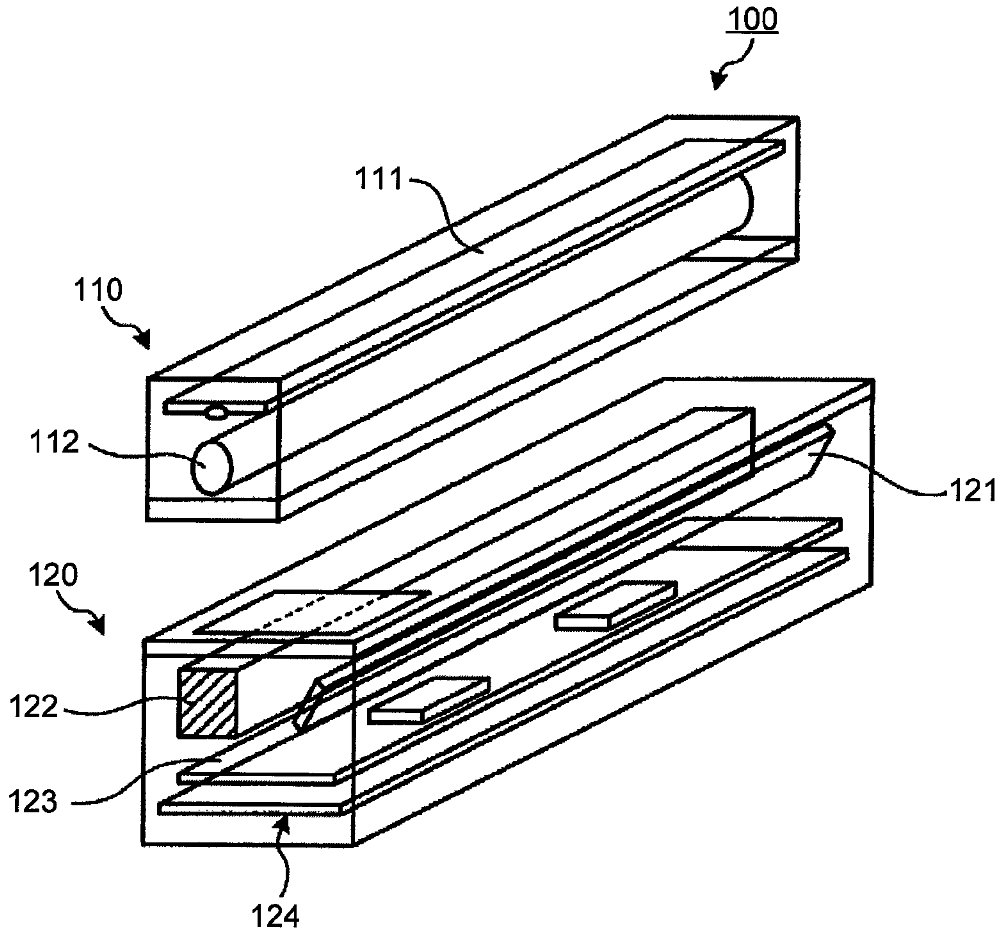
FIG. 2A is a schematic diagram of an example of a structure of a transmissive/reflective line sensor that includes a multi-wavelength light source.

A structure of the image line sensor is explained next. FIG. 2A is a schematic diagram of an example of a structure of a transmissive/reflective image line sensor 100 that includes a multi-wavelength light source. The image line sensor 100 includes a rectangular light emitting unit 110 and a rectangular light emitting and photodetecting unit 120 that are opposed to each other. The banknote that is the medium to be recognized is transported through a banknote path between the light emitting unit 110 and the light emitting and photodetecting unit 120.

The light emitting unit 110 includes a line-shaped two-wavelength transmissive LED array 111 and a rod lens 112 that form an integrated unit, and uniformly irradiates a passing banknote. The light emitting and photodetecting unit 120 includes a line-shaped two-wavelength reflective LED array 121, a photodiode array 123 that receives light, a Selfoc lens array (SLA) 122 that increases directivity of the light by limiting a light receiving angle of the photodiode array 123 thereby improving a resolution, and a multiplexer circuit 124 that is capable of controlling an accumulation time of each element of the photodiode array 123 that form an integrated unit.

The two-wavelength transmissive LED array 111 and the two-wavelength reflective LED array 121 are controlled by a current-controlled driving circuit. A sensing output of the photodiode array 123 is controlled at an appropriate accumulation time and outputted according to an emission wavelength of the multiplexer circuit 124. The LED array is a combination of LED elements that emit infrared light and other visible light (for example, green light), and can be a combination of red, green, and blue lights according to the objective or the object that is to be recognized. Furthermore, an LED is used as the light-emitting element; however, other elements can also be used. Furthermore, the two-wavelength transmissive LED elements and the two-wavelength reflective LED elements have been shown only as examples; multiple wavelengths can be processed as desired irrespective of whether the sensor is transmissive or reflective.

At each detecting position of the banknote, distribution data (line sensor information) of the physical quantities of the reflected light and the transmitted light is converted by an A/D conversion function of the line sensor 11 into an electric signal of a predetermined magnitude, and is temporarily stored in a not shown storage unit of the recognition unit 60.

A single-side reflective/transmissive line sensor is explained above. However, as another form of the line sensor, a both-side reflective/single-side transmissive line sensor is explained below.

Figure 2B:
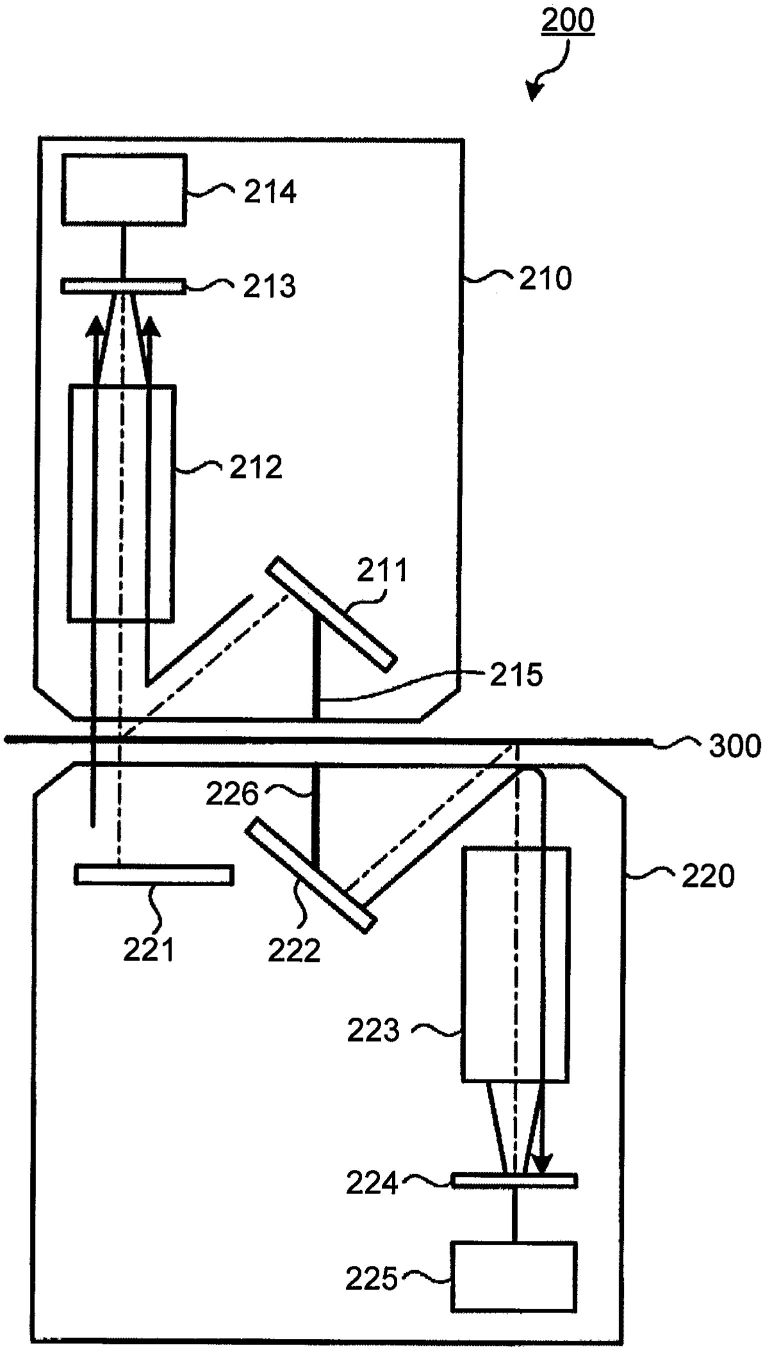
FIG. 2B is a schematic diagram of an example of a structure of a both-side reflective/single-side transmissive line sensor that is another type of an image line sensor.

FIG. 2B is a schematic diagram of an example of a structure of the both-side reflective/single-side transmissive line sensor that is another type of the image line sensor. As shown in FIG. 2B, an image line sensor 200 includes a first line sensor 210 and a second line sensor 220. The first line sensor 210 reads, by using a visible light, an image on one surface of a banknote 300 fed for recognition of a denomination, fitness, and authenticity thereof, and the second line sensor 220 reads an image on the other surface of the deposited banknote 300 by using the visible light.

The first line sensor 210 includes a reflective light source 211 that irradiates one surface of the banknote 300 with a light (for example, invisible light like the infrared light or visible light like a green light) of a predetermined wavelength, a lens 212 that collects the light outputted from the reflective light source 211 and is reflected from the banknote 300, a light receiving unit 213 that converts the light collected by the lens 212 into an electric signal, an A/D converter 214 that converts the electric signal converted by the light receiving unit 213 into a signal of a predetermined magnitude, and a blocking unit 215 that blocks, while the light receiving unit 213 reads an image, a light outputted from a reflective light source 222 of the second line sensor 220 which is explained later.

Similarly, the second line sensor 220 also includes a transmissive light source 221 that irradiates the other surface of the banknote 300 with a light of a predetermined wavelength, the reflective light source 222 that irradiates the other surface of the banknote 300 with a light of a predetermined wavelength, a lens 223 that collects the light reflected from the banknote 300, a light receiving unit 224 that converts the light collected by the lens 223 into an electric signal, an A/D converter 225 that converts the electric signal converted by the light receiving unit 224 into a signal of a predetermined magnitude, and a blocking unit 226 that blocks, while the light receiving unit 224 reads an image, the light reflected from the reflective light source 211 of the first line sensor 210. A part of the light outputted from the transmissive light source 221 of the second line sensor 220 is detected by the light receiving unit 213 through the lens 212 of the first light sensor. Consequently, the transmissive light source 221 is arranged on an optical axis of the lens 212 of the first line sensor 210.

It is preferable that LEDs (Light Emitting Diode) be used as the reflective light sources 211 and 222 of the first line sensor 210 and the second line sensor 220, respectively. To enable reading of the banknotes used in various countries and regions, it is preferable that red, green, and blue LEDs capable of emitting a visible light of desired wavelengths be used.

In the present invention, other than the above-mentioned line sensors, both-side reflective/both-side transmissive line sensors can also be used.

The banknote recognition apparatus 1 according to the present embodiment includes, other than the image line sensors, the magnetic sensor 21 that measures magnetic characteristics of the banknote. The banknote recognition apparatus 1 performs magnetic sensing of an ink, etc., printed on the banknote by the magnetic sensor 21, and creates magnetic sensor information from the sensing result. A single magnetic sensor or a plurality of magnetic sensors can be used. Alternatively, a plurality of magnetic sensors in an array form can be integrated into a single unit.

The banknote recognition apparatus 1 according to the present embodiment further includes the thickness sensor 22 that measures a thickness of the banknote. The banknote recognition apparatus 1 performs sensing of the thickness of the banknote by the thickness sensor 22, and creates thickness sensor information from the sensing result. A transmissive optical sensor, a mechanical sensor, etc., can be used as the thickness sensor 22.

The banknote recognition apparatus 1 according to the present embodiment further includes the UV sensor 23 that irradiates the banknote with an ultraviolet light, performs sensing of a reflected visible light quantity and a transmitted ultraviolet light quantity, and creates UV sensor information from the sensing result.

The recognition unit 60 includes, as shown in FIG. 1, a denomination recognition unit 30, a fitness recognition unit 40, and an authenticity recognition unit 50.

The denomination recognition unit 30 performs recognition of the denomination of the banknote and an orientation of the banknote, based on an image data of the banknote acquired from the line sensor 11. That is, the denomination recognition unit 30 performs recognition of the banknote by performing matching of the image data of the banknote acquired from the line sensor 11 and a reference data (denomination-wise reference data that is a reference for each denomination of the banknote) for the denomination recognition. The reference data used for recognition, which includes a predetermined checking position on the banknote, permissible range of data at the predetermined position, etc., are stored previously in a table. The table is categorized denomination-wise and orientation-wise, and is stored in the denomination recognition unit 30. Furthermore, in the present embodiment, since a banknote is used as an example of a paper sheet, recognition of the denomination of the banknote is explained as an example of the type of the paper sheet. Also, the country of the banknote can be included in the type of the paper sheet. The present invention can be applied to paper sheets other than banknotes, such as checks, drafts, and gift coupons.

The fitness recognition unit 40 performs recognition of the fitness of the banknote in terms of soiling, tears, defacement due to loss of a part of the banknote or scribbling, etc., based on the image data of the banknote acquired from the line sensor 11.

For recognition of banknotes with soiling due to scribbling, based on the images of a plurality of unscribbled banknotes, an area-designating image, which is formed from an area (recognition target area) where there is a high possibility of scribbling and an area (non-target area) where there is a low possibility of scribbling, is prepared previously. When the image of the banknote that is a target for unfitness recognition is acquired, an unfitness recognition of the banknote is performed based on the image of the target banknote and the area-designating image.

Furthermore, the fitness recognition unit 40 performs recognition of the fitness of the banknote based on the line sensor information created by the line sensor 11. That is, the fitness recognition unit 40 determines the fitness of the banknote in terms of defacement due to a tear in the banknote or scribbling on the banknote by performing matching of the image data acquired from the line sensor 11 and the reference data for fitness recognition, and performs recognition of an unfit note. The reference data used for the recognition, which includes a predetermined checking position on the banknote, permissible range of data at the predetermined position, etc., are stored previously in a table. The table is categorized denomination-wise and orientation-wise, and is stored in the fitness recognition unit 40.

The fitness recognition unit 40 performs matching of the thickness sensor information created by the thickness sensor 22 and the reference data for fitness recognition, and performs recognition of presence or absence of a tape stuck to the banknote, or whether two banknotes are duplicated, etc.

The authenticity recognition unit 50 performs recognition of the authenticity of the banknote based on the image data of the banknote acquired from the line sensor 11. Specifically, the authenticity recognition unit 50 extracts a serial number of the banknote from the image data of the banknote acquired from the line sensor 11, and performs recognition of the authenticity of the banknote by performing checking of the serial number. The authenticity recognition unit 50 can also perform recognition of the authenticity of the banknote based on infrared light data.

Furthermore, the authenticity recognition unit 50 performs recognition of the authenticity of the banknote based on the sensor information of the magnetic sensor 21, the UV sensor 23, etc. Specifically, the authenticity recognition unit 50 performs recognition (identification) of the authenticity of the banknote by performing matching of the magnetic sensor information created by the magnetic sensor 21 and the reference data for authenticity recognition.

Furthermore, the authenticity recognition unit 50 performs recognition (identification) of the authenticity of the banknote by performing matching of the UV sensor information created by the UV sensor 23 and the reference data for authenticity recognition.

Figures 3A, 3B:
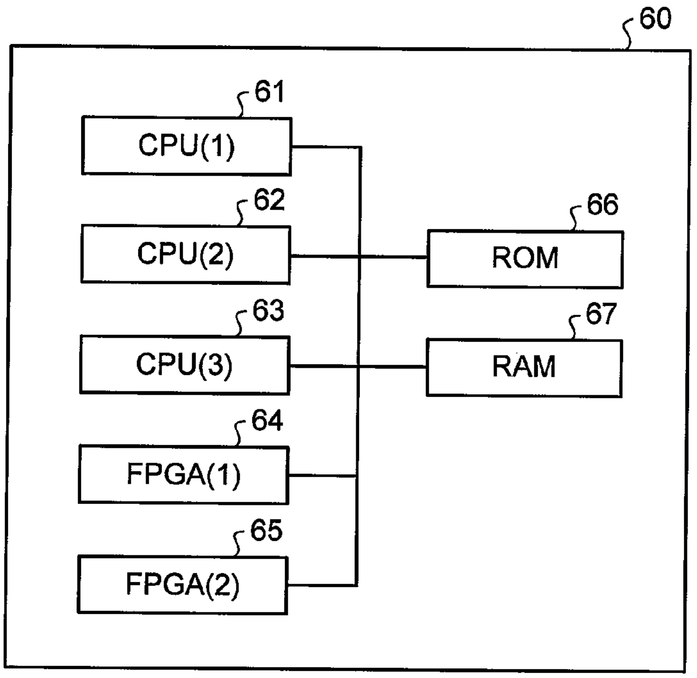
FIG. 3A is a block diagram showing main components of a recognition unit of the banknote recognition apparatus according to the present embodiment.
FIG. 3B is a table showing configuration patterns of control units in the recognition unit that perform control of a denomination recognition process, an authenticity recognition process, and a fitness recognition process.

The recognition unit 60 described above includes a CPU that controls the operations of each of the recognition units, a ROM that stores therein computer programs, a RAM that stores therein the reference data, information from each of the sensors, etc. In the banknote recognition apparatus according to the present embodiment, the recognition unit 60 includes, for example, a CPU(1) 61, a CPU(2) 62, a CPU(3) 63, an FPGA (Field Programmable Gate Array) (1) 64, an FPGA(2) 65, a ROM 66, and a RAM 67, as shown in FIG. 3A. FIG. 3A is a block diagram showing the main hardware components of the recognition unit 60.

In the present invention, it is preferable that control of each of the processes of denomination recognition (including orientation of the banknote), authenticity recognition, and fitness recognition be performed in a shared manner by at least two or more independent control units (CPU, etc.). By having two or more independent control units (CPU, etc.) control each of the above-mentioned processes, the recognition process can be efficiently performed in a short time, even if the processing loads are heavy.

In FIG. 3A, for example, the CPU(1) 61 is a control unit that controls processing of information relating to an optical line sensor. The CPU(2) 62 is a control unit that controls processing of information relating to sensors other than the optical line sensor. Each of the processes of the denomination recognition (including orientation of the banknote), authenticity recognition, and fitness recognition is controlled by the CPU(1) 61 and CPU(2) 62.

A serial number recognition process, which is a part of the authenticity recognition, is controlled by the FPGA(1) 64. A scribble recognition process, which is a part of the fitness recognition, is controlled by the FPGA(2) 65. The CPU(3) 63 performs processes which are related to the FPGA(1) 64 and the FPGA(2) 65 and include communication thereof with the CPU(1).

Based on the computer programs stored in the ROM 66, each of the CPUs controls each of the recognition units while using the RAM 67. Furthermore, in FIG. 3A, the CPU(1) 61 functions as a main CPU of the banknote recognition apparatus. However, the main CPU need not be limited to the CPU(1) 61; any other CPU can function as the main CPU. The recognition unit 60 according to the present embodiment can thus be configured as described above.

The structure shown in FIG. 3A is an example of the main hardware components of the recognition unit 60. Another examples of the main hardware components (control units) of the recognition unit 60 are explained using three major patterns classified.

First, a case in which the control units constituting the recognition unit 60 are categorized based on the recognition processes without categorizing the sensor system is explained with reference to FIG. 3B. FIG. 3B is a table showing configuration patterns of the control units in the recognition unit 60 that perform control of the denomination recognition process (control of the denomination recognition unit 30), the authenticity recognition process (control of the authenticity recognition unit 50), and the fitness recognition process (control of the fitness recognition unit 40). In the configuration patterns shown in FIG. 3B, the control units constituting the recognition unit 60 are all CPUs.

As shown in FIG. 3B, in a pattern 1, the CPU(1) performs the control of the denomination recognition process (the control of the denomination recognition unit 30), the CPU(1) performs the control of the authenticity recognition process (the control of the authenticity recognition unit 50), and the CPU(2) performs the control of the fitness recognition process (the control of the fitness recognition unit 40). In a pattern 2, the CPU(1) performs the control of the denomination recognition process (the control of the denomination recognition unit 30), the CPU(2) performs the control of the authenticity recognition process (the control of the authenticity recognition unit 50), and the CPU(1) performs the control of the fitness recognition process (the control of the fitness recognition unit 40).

Furthermore, in a pattern 3, the CPU(1) performs the control of the denomination recognition process (the control of the denomination recognition unit 30), the CPU(2) performs the control of the authenticity recognition process (the control of the authenticity recognition unit 50), and the CPU(2) performs the control of the fitness recognition process (the control of the fitness recognition unit 40). In a pattern 4, the CPU(1) performs the control of the denomination recognition process (the control of the denomination recognition unit 30), the CPU(2) performs the control of the authenticity recognition process (the control of the authenticity recognition unit 50), and the CPU(3) performs the control of the fitness recognition process (the control of the fitness recognition unit 40).

In the above explanation, the control units constituting the recognition unit 60 are all CPUs. However, instead of the CPUs, the FPGAs can also be used. The advantages of using the FPGAs are that they are inexpensive, and because they are hardware, can perform processing faster than software.

The following configurations are possible as modifications in which the FPGAs are used instead of the CPUs.

First Modification

In a first modification, at least one CPU(1) in each of the patterns shown in FIG. 3B is changed to the FPGA. For example, in the pattern 1, the CPU(1) that performs the control of the denomination recognition process (the control of the denomination recognition unit 30) and the control of the authenticity recognition process (the control of the authenticity recognition unit 50) can be changed to the FPGA. In this case, an FPGA(1) performs the control of the denomination recognition process (the control of the denomination recognition unit 30) and the control of the authenticity recognition process (the control of the authenticity recognition unit 50), and the CPU(2) performs the control of the fitness recognition process (the control of the fitness recognition unit 40). Furthermore, two FPGAs can also be used; an FPGA(1) for performing the control of the denomination recognition process (the control of the denomination recognition unit 30) and an FPGA(2) for performing the control of the authenticity recognition process (the control of the authenticity recognition unit 50).

Furthermore, a configuration in which the control of either of the denomination recognition process (the control of the denomination recognition unit 30) or the authenticity recognition process (the control of the authenticity recognition unit 50) is performed by the FPGA is also possible. In this case, the FPGA performs the control of the denomination recognition process (the control of the denomination recognition unit 30), the CPU(1) performs the control of the authenticity recognition process (the control of the authenticity recognition unit 50), and the CPU(2) performs the control of the fitness recognition process (the control of the fitness recognition unit 40). Alternatively, the CPU(1) can perform the control of the denomination recognition process (the control of the denomination recognition unit 30), the FPGA can perform the control of the authenticity recognition process (the control of the authenticity recognition unit 50), and the CPU(2) can perform the control of the fitness recognition process (the control of the fitness recognition unit 40).

The CPU(1), the CPU(2), or the CPU(3) can double up as a control unit for performing control of the FPGA. Alternatively, an independent CPU(4) can be used exclusively for performing the control of the FPGA.

Second Modification

In a second modification, at least one CPU(2) in each of the patterns shown in FIG. 3B is changed to the FPGA. For example, in the pattern 3, the CPU(2) that performs the control of the authenticity recognition process (the control of the authenticity recognition unit 50) and the control of the fitness recognition process (the control of the fitness recognition unit 40) can be changed to the FPGA. In this case, the CPU(1) performs the control of the denomination recognition process (the control of the denomination recognition unit 30) and the FPGA performs the control of the authenticity recognition process (the control of the authenticity recognition unit 50) and the fitness recognition process (the control of the fitness recognition unit 40). Furthermore, two FPGAs can also be used; the FPGA(1) for performing the control of the authenticity recognition process (the control of the authenticity recognition unit 50) and the FPGA(2) for performing the control of the fitness recognition process (the control of the fitness recognition unit 40).

Furthermore, a configuration in which the control of either of the authenticity recognition process (the control of the authenticity recognition unit 50) or the fitness recognition process (the control of the fitness recognition unit 40) is performed by the FPGA is also possible. In this case, the CPU(1) performs the control of the denomination recognition process (the control of the denomination recognition unit 30), the FPGA performs the control of the authenticity recognition process (the control of the authenticity recognition unit 50), and the CPU(2) performs the control of the fitness recognition process (the control of the fitness recognition unit 40). Alternatively, the CPU(1) can perform the control of the denomination recognition process (the control of the denomination recognition unit 30), the CPU(2) can perform the control of the authenticity recognition process (the control of the authenticity recognition unit 50), and the FPGA can perform the control of the fitness recognition process (the control of the fitness recognition unit 40).

The CPU(1), the CPU(2), the CPU(3) can double up as a control unit for performing the control of the FPGA. Alternatively, an independent CPU(4) can be used exclusively for performing the control of the FPGA.

Third Modification

In a third modification, the CPU(3) in each of the patterns shown in FIG. 3B is changed to the FPGA. For example, in the pattern 4, the CPU(3) that performs the control of the fitness recognition process (the control of the fitness recognition unit 40) can be changed to the FPGA. In this case, the CPU(1) performs the control of the denomination recognition process (the control of the denomination recognition unit 30), the CPU(2) performs the control of the authenticity recognition process (the control of the authenticity recognition unit 50), and the FPGA performs the control of the fitness recognition process (the control of the fitness recognition unit 40).

The CPU(1) or the CPU(2) can double up as a control unit for performing the control of the FPGA. Alternatively, an independent CPU(4) can be used exclusively for performing the control of the FPGA.

Fourth Modification

A fourth modification can be configured by any combination of the first to third modifications.

Furthermore, in the first to fourth modifications, a plurality of the control units (CPUs, FPGAs, etc.) can be used for performing the control of the authenticity recognition process (the control of the authenticity recognition unit 50) and the control of the fitness recognition process (the control of the fitness recognition unit 40).

In the above modification, a case in which the FPGA is used as the control unit for the denomination recognition process is presented as an example. However, because the line sensor information is used for the denomination recognition process, there is a huge processing load. Therefore, it is preferable that a CPU be used for fast processing.

A case in which each of the authenticity recognition process and the fitness recognition process is divided into two stages is explained next with reference to FIG. 3C. That is, the fitness recognition process includes a first fitness recognition process in which the fitness recognition process is performed based on the line sensor information and a second fitness recognition process in which the fitness recognition process is performed based on point sensor information. Similarly, the authenticity recognition process includes a first authenticity recognition process in which the authenticity recognition process is performed based on the line sensor information and a second authenticity recognition process in which the authenticity recognition process is performed based on the point sensor information.

The first fitness recognition process, for example, is a recognition process in which a reflected green image, a transmitted green image, a reflected infrared image, a transmitted infrared image, etc., are used as the line sensor information. The second fitness recognition process, for example, is a recognition process in which an outputted from a transmissive infrared sensor is used as the sensor information.

The first authenticity recognition process, for example, is a recognition process in which a UV image, a magnetic image, a reflected infrared image, a transmitted infrared image, etc., are used as the line sensor information. The second authenticity recognition process, for example, is a recognition process in which outputs of the UV sensor, the magnetic sensor, and a capacitance sensor are used.

FIG. 3C is a table showing configuration patterns of the control units in the recognition unit 60 that perform control of the first fitness recognition process, the second fitness recognition process, the first authenticity recognition process, and the second authenticity recognition process. In the configuration patterns shown in FIG. 3C, the control units constituting the recognition unit 60 are all CPUs. In the patterns and the modifications explained below, either of the CPU or the FPGA can be used as the control unit for performing the control of the denomination recognition process. However, because the line sensor information is used for the denomination recognition process, there is a huge processing load. Therefore, it is preferable that a CPU be used for fast processing.

As shown in FIG. 3C, in a pattern 5, the CPU(1) performs the control of the first fitness recognition process, the CPU(1) performs the control of the first authenticity recognition process, the CPU(2) performs the control of the second fitness recognition process, and the CPU(2) performs the control of the second authenticity recognition process. In a pattern 6, the CPU(1) performs the control of the first fitness recognition process, the CPU(2) performs the control of the first authenticity recognition process, the CPU(1) performs the control of the second fitness recognition process, and the CPU(2) performs the control of the second authenticity recognition process.

In a pattern 7, the CPU(1) performs the control of the first fitness recognition process, the CPU(2) performs the control of the first authenticity recognition process, the CPU(2) performs the control of the second fitness recognition process, and the CPU(1) performs the control of the second authenticity recognition process. In a pattern 8, the CPU(1) performs the control of the first fitness recognition process, the CPU(1) performs the control of the first authenticity recognition process, the CPU(1) performs the control of the second fitness recognition process, and the CPU(2) performs the control of the second authenticity recognition process.

In a pattern 9, the CPU(1) performs the control of the first fitness recognition process, the CPU(1) performs the control of the first authenticity recognition process, the CPU(2) performs the control of the second fitness recognition process, and the CPU(1) performs the control of the second authenticity recognition process. In a pattern 10, the CPU(1) performs the control of the first fitness recognition process, the CPU(2) performs the control of the first authenticity recognition process, the CPU(1) performs the control of the second fitness recognition process, and the CPU(1) performs the control of the second authenticity recognition process.

In a pattern 11, the CPU(2) performs the control of the first fitness recognition process, the CPU(1) performs the control of the first authenticity recognition process, the CPU(1) performs the control of the second fitness recognition process, and the CPU(1) performs the control of the second authenticity recognition process. In the patterns 5 to 11 described above, two CPUs have been used.

In a pattern 12, the CPU(1) performs the control of the first fitness recognition process, the CPU(1) performs the control of the first authenticity recognition process, the CPU(2) performs the control of the second fitness recognition process, and the CPU(3) performs the control of the second authenticity recognition process. In a pattern 13, the CPU(1) performs the control of the first fitness recognition process, the CPU(2) performs the control of the first authenticity recognition process, the CPU(1) performs the control of the second fitness recognition process, and the CPU(3) performs the control of the second authenticity recognition process.

In a pattern 14, the CPU(1) performs the control of the first fitness recognition process, the CPU(2) performs the control of the first authenticity recognition process, the CPU(3) performs the control of the second fitness recognition process, and the CPU(1) performs the control of the second authenticity recognition process. In a pattern 15, the CPU(1) performs the control of the first fitness recognition process, the CPU(2) performs the control of the first authenticity recognition process, the CPU(2) performs the control of the second fitness recognition process, and the CPU(3) performs the control of the second authenticity recognition process.

In a pattern 16, the CPU(1) performs the control of the first fitness recognition process, the CPU(2) performs the control of the first authenticity recognition process, the CPU(3) performs the control of the second fitness recognition process, and the CPU(2) performs the control of the second authenticity recognition process. In a pattern 17, the CPU(1) performs the control of the first fitness recognition process, the CPU(3) performs the control of the first authenticity recognition process, the CPU(2) performs the control of the second fitness recognition process, and the CPU(2) performs the control of the second authenticity recognition process. In the patterns 12 to 17 described above, three CPUs have been used.

In a pattern 18, the CPU(1) performs the control of the first fitness recognition process, the CPU(2) performs the control of the first authenticity recognition process, the CPU(3) performs the control of the second fitness recognition process, and the CPU(4) performs the control of the second authenticity recognition process. In the pattern 18, four CPUs have been used.

In the above description, the control units constituting the recognition unit 60 are all CPUs. However, instead of the CPUs, the FPGAs can also be used. The following configurations are possible as modifications in which the FPGAs are used instead of the CPUs.

Fifth Modification

In a fifth modification, at least one CPU(1) in each of the patterns shown in FIG. 3C is changed to the FPGA. For example, in the pattern 5, the CPU(1) that performs the control of the first fitness recognition process and the first authenticity recognition process can be changed to the FPGA. In this case, the control of the first fitness recognition process and the first authenticity recognition process are performed by the FPGA, and the control of the second fitness recognition process and the second authenticity recognition process are performed by the CPU(2). Furthermore, two FPGAs can also be used; the FPGA 1 for performing the first fitness recognition process and the FPGA 2 for performing the first authenticity recognition process.

Furthermore, a configuration in which the control of either of the first fitness recognition process or the first authenticity recognition process is performed by the FPGA is also possible. In this case, the FPGA performs the first fitness recognition process, the CPU(1) performs the control of the first authenticity recognition process, the CPU(2) performs the control of the second fitness recognition process, and the CPU(2) performs the control of the second authenticity recognition process.

Any of the CPU(1) to the CPU(4) can double up as a control unit for performing the control of the FPGA. Alternatively, a not shown independent CPU(5) can be used exclusively for performing the control of the FPGA.

Sixth Modification

In a sixth modification, at least one CPU(2) in each of the patterns shown in FIG. 3C is changed to the FPGA, as in the second modification. Any of the CPU(1) to the CPU(4) can double up as a control unit for performing the control of the FPGA. Alternatively, a not shown independent CPU(5) can be used exclusively for performing the control of the FPGA.

Seventh Modification

In a seventh modification, at least one CPU(3) in each of the patterns shown in FIG. 3C is changed to the FPGA, as in the third modification. Any of the CPU(1) to the CPU(4) can double up as a control unit for performing the control of the FPGA. Alternatively, a not shown independent CPU(5) can be used exclusively for performing the control of the FPGA.

Eighth Modification

In an eighth modification, the CPU(4) in each of the patterns shown in FIG. 3C is changed to the FPGA. Any of the CPU(1) to the CPU(3) can double up as a control unit for performing the control of the FPGA. Alternatively, a not shown independent CPU(5) can be used exclusively for performing the control of the FPGA.

Ninth Modification

A ninth modification can be configured by any combination of the fifth to eighth modifications.

A case in which processes are categorized into processes performed based on optical image information acquired from the optical image line sensor (hereinafter, "optical line sensor processes") and processes performed based on the point sensor information acquired from the sensors other than the optical image line sensor (hereinafter, "other sensor processes") is explained next with reference to FIG. 3D. For example, the magnetic sensor (a line-shaped sensor having a plurality of channels), the UV sensors, infrared transmissive sensors, mechanical thickness sensors, etc., fall under the category other sensors.

FIG. 3D is a table showing configuration patterns of the control units in the recognition unit 60 that perform control of the optical line sensor processes and the other sensor processes. In the configuration patterns shown in FIG. 3D, the control units constituting the recognition unit 60 are the CPUs and the FPGAs. In the patterns and the modifications explained below, either of the CPU or the FPGA can be used as the control unit for performing the control of the denomination recognition process. However, because the line sensor information is used for the denomination recognition process, there is a huge processing load. Therefore, it is preferable that a CPU be used for fast processing.

As shown in FIG. 3D, in a pattern 19, the CPU(1) performs the control of the optical line sensor processes and the CPU(2) performs the control of the other sensor processes. The optical line sensor processes include at least the denomination recognition process, the fitness recognition process (by soiling detection), and the authenticity recognition process (based on infrared sensor data). The other sensor processes include the authenticity recognition process performed based on the magnetic sensor information, the authenticity recognition process performed based on the UV sensor information, and the authenticity recognition process and the fitness recognition process performed based on the information acquired from the infrared transmissive sensor and the mechanical thickness sensor.

Tenth Modification

As a tenth modification, the CPU(1) in the pattern 19 shown in FIG. 3D is changed to the FPGA. The control of the FPGA can be performed by the CPU(2) or exclusively by an independent CPU(3) (patterns 20 and 21).

Eleventh Modification

In an eleventh modification, the CPU(2) in the pattern 19 shown in FIG. 3D is changed to the FPGA. The control of the FPGA can be performed by the CPU(1) or exclusively by an independent CPU(3) (patterns 22 and 23).

Twelfth Modification

In a twelfth modification, in the pattern 19 shown in FIG. 3D, the optical line sensor processes are controlled by the CPU(1), and the FPGA 1 and the FPGA 2. The control of the FPGA can be performed by the CPU(1) or the CPU(2) or exclusively by an independent CPU(3) (patterns 24 to 26).

The CPU(1) performs the control of the optical line sensor processes, which include at least the denomination recognition process, the fitness recognition process (by soiling detection), and the authenticity recognition process (based on the infrared sensor data). The CPU(2) performs control of the other sensor processes, which include the authenticity recognition process performed based on the magnetic sensor information, the authenticity recognition process performed based on the UV sensor information, and the authenticity recognition process and the fitness recognition process performed based on the information acquired from the infrared transmissive sensor and the mechanical thickness sensor. The FPGA 1 performs the control of the detection of soiling due to scribbling (fitness recognition process) and the FPGA 2 performs the control of the recognition of the serial number (authenticity recognition process).

Thirteenth Modification

In a thirteenth modification, in the pattern 19 shown in FIG. 3D, the other sensor processes are controlled by the CPU(2), and the FPGA 1 and the FPGA 2. The control of the FPGA can be performed by the CPU(1) or the CPU(2) or exclusively by an independent CPU(3) (patterns 27 to 29).

The CPU(1) performs the control of the optical line sensor processes, which include at least the denomination recognition process, the fitness recognition process (by scribble and soiling detection), and the authenticity recognition process (based on the infrared sensor data). The FPGA 1 performs the control of the authenticity recognition process based on the information acquired from the magnetic sensor, and the FPGA 2 performs the control of the fitness recognition process based on the information acquired from the UV sensor. The CPU(2) performs the control of the other sensor processes other than those controlled by the FPGA 1 and the FPGA 2.

Fourteenth Modification

A fourteenth modification can be configured by any combination of the tenth to thirteenth modifications.

By configuring as explained with reference to the patterns 1 to 19 and the modifications 1 to 14, the processing load on the control units constituting the recognition unit 60 can be shared. A faster processing can be achieved by efficiently sharing the processing load of each of the recognition processes.

A case in which each of the denomination recognition process and the authenticity recognition process is divided into two stages is explained next with reference to FIG. 3E. That is, the denomination recognition process includes a first denomination recognition process in which a banknote denomination recognition process is performed based on the line sensor information and a second denomination recognition process, which is the final denomination recognition process performed based on a recognition result obtained from the first denomination recognition process and a recognition result obtained from a first authenticity recognition process. Similarly, the authenticity recognition process includes the first authenticity recognition process in which part of the data acquired from, for example, the line sensor system is used in the recognition process and a second authenticity recognition process in which a recognition of a degree of genuineness (authenticity) of the banknote that is recognized to be genuine in the first authenticity recognition process performed based on the sensor information acquired from the other sensors is performed.

FIG. 3E is a table showing configuration patterns of the control units in the recognition unit 60 that perform control of the first denomination recognition process, the second denomination recognition process, the first authenticity recognition process, and the second authenticity recognition process. In the configuration patterns shown in FIG. 3E, the control units constituting the recognition unit 60 are all CPUs.

As shown in FIG. 3E, in a pattern 30, the CPU(1) performs the control of the first denomination recognition process, the CPU(1) performs the control of the first authenticity recognition process, the CPU(2) performs the control of the second denomination recognition process, and the CPU(2) performs the control of the second authenticity recognition process. In a pattern 31, the CPU(1) performs the control of the first denomination recognition process, the CPU(2) performs the control of the first authenticity recognition process, the CPU (1) performs the control of the second denomination recognition process, and the CPU(2) performs the control of the second authenticity recognition process.

In a pattern 32, the CPU(1) performs the control of the first denomination recognition process, the CPU(2) performs the control of the first authenticity recognition process, the CPU (2) performs the control of the second denomination recognition process, and CPU(1) performs the control of the second authenticity recognition process. In a pattern 33, the CPU(1) performs the control of the first denomination recognition process, the CPU(1) performs the control of the first authenticity recognition process, the CPU(1) performs the control of the second denomination recognition process, and the CPU (2) performs the control of the second authenticity recognition process.

In a pattern 34, the CPU(1) performs the control of the first denomination recognition process, the CPU(1) performs the control of the first authenticity recognition process, the CPU (2) performs the control of the second denomination recognition process, and the CPU(1) performs the control of the second authenticity recognition process. In a pattern 35, the CPU(1) performs the control of the first denomination recognition process, the CPU(2) performs the control of the first authenticity recognition process, the CPU(1) performs the control of the second denomination recognition process, and the CPU(1) performs the control of the second authenticity recognition process.

In a pattern 36, the CPU(2) performs the control of the first denomination recognition process, the CPU(1) performs the control of the first authenticity recognition process, the CPU (1) performs the control of the second denomination recognition process, and the CPU(1) performs the control of the second authenticity recognition process. In the patterns 30 to 36 described above, two CPUs have been used.

In a pattern 37, the CPU(1) performs the control of the first denomination recognition process, the CPU(1) performs the control of the first authenticity recognition process, the CPU (2) performs the control of the second denomination recognition process, and the CPU(3) performs the control of the second authenticity recognition process. In a pattern 38, the CPU(1) performs the control of the first denomination recognition process, the CPU(2) performs the control of the first authenticity recognition process, the CPU(1) performs the control of the second denomination recognition process, and the CPU(3) performs the control of the second authenticity recognition process.

In a pattern 39, the CPU(1) performs the control of the first denomination recognition process, the CPU(2) performs the control of the first authenticity recognition process, the CPU (3) performs the control of the second denomination recognition process, and the CPU(1) performs the control of the second authenticity recognition process. In a pattern 40, the CPU(1) performs the control of the first denomination recognition process, the CPU(2) performs the control of the first authenticity recognition process, the CPU(2) performs the control of the second denomination recognition process, and the CPU(3) performs the control of the second authenticity recognition process.

In a pattern 41, the CPU(1) performs the control of the first denomination recognition process, the CPU(2) performs the control of the first authenticity recognition process, the CPU (3) performs the control of the second denomination recognition process, and the CPU(2) performs the control of the second authenticity recognition process. In a pattern 42, the CPU(1) performs the control of the first denomination recognition process, the CPU(3) performs the control of the first authenticity recognition process, the CPU(2) performs the control of the second denomination recognition process, and the CPU(2) performs the control of the second authenticity recognition process. In the patterns 37 to 42 described above, three CPUs have been used.

In a pattern 43, the CPU(1) performs the control of the first denomination recognition process, the CPU(2) performs the control of the first authenticity recognition process, the CPU (3) performs the control of the second denomination recognition process, and the CPU(4) performs the control of the second authenticity recognition process. In the pattern 43, four CPUs have been used.

In the above description, the control units constituting the recognition unit 60 are all CPUs. However, instead of the CPUs, the FPGAs can also be used. The following configurations are possible as modifications in which the FPGAs are used instead of the CPUs.

Fifteenth Modification

In a fifteenth modification, at least one CPU(1) in each of the patterns shown in FIG. 3E is changed to the FPGA, as in the first modification. For example, in the pattern 30, the CPU(1) that performs the control of the first denomination recognition process and the first authenticity recognition process can be changed to the FPGA. In this case, the FPGA performs the control of the first denomination recognition process and the first authenticity recognition process, and the CPU(2) performs the control of the second denomination recognition process and the second authenticity recognition process. Furthermore, two FPGAs can also be used; the FPGA 1 for performing the control of the first denomination recognition process and the FPGA 2 for performing the control of the first authenticity recognition process.

Furthermore, a configuration in which the control of either of the first denomination recognition process or the first authenticity recognition process is performed by the FPGA is also possible. In this case, the FPGA performs the control of the first denomination recognition process, the CPU(1) performs the control of the first authenticity recognition process, and the CPU(2) performs the control of the second denomination recognition process and the second authenticity recognition process. Alternatively, the CPU(1) can perform the control of the first denomination recognition process, the FPGA can perform the control of the first authenticity recognition process, and the CPU(2) can perform the control of the second denomination recognition process and the second authenticity recognition process.

Any of the CPU(1) to the CPU(4) can double up as a control unit for performing the control of the FPGA. Alternatively, a not shown independent CPU(5) can be used exclusively for performing the control of the FPGA.

Sixteenth Modification

In a sixteenth modification, at least one CPU(2) in each of the patterns shown in FIG. 3E is changed to the FPGA, as in the second modification. Any of the CPU(1) to the CPU(4) can double up as a control unit for performing the control of the FPGA. Alternatively, a not shown independent CPU(5) can be used exclusively for performing the control of the FPGA.

Seventeenth Modification

In a seventeenth modification, at least one CPU(3) in each of the patterns shown in FIG. 3E is changed to the FPGA, as in the third modification. Any of the CPU(1) to the CPU(4) can double up as a control unit for performing the control of the FPGA. Alternatively, a not shown independent CPU(5) can be used exclusively for performing the control of the FPGA.

Eighteenth Modification

In an eighteenth modification, at least one CPU(4) in each of the patterns shown in FIG. 3E is changed to the FPGA. Any of the CPU(1) to the CPU(3) can double up as a control unit for performing the control of the FPGA. Alternatively, a not shown independent CPU(5) can be used exclusively for performing the control of the FPGA.

Nineteenth Modification

A nineteenth modification can be configured by any combination of the fifteenth to eighteenth modifications.

By configuring as explained with reference to the patterns 1 to 43 and the modifications 1 to 19, the processing load on the control units constituting the recognition unit 60 can be shared. A faster processing can be achieved by efficiently distributing the processing load of each of the recognition processes.

Figure 4A:
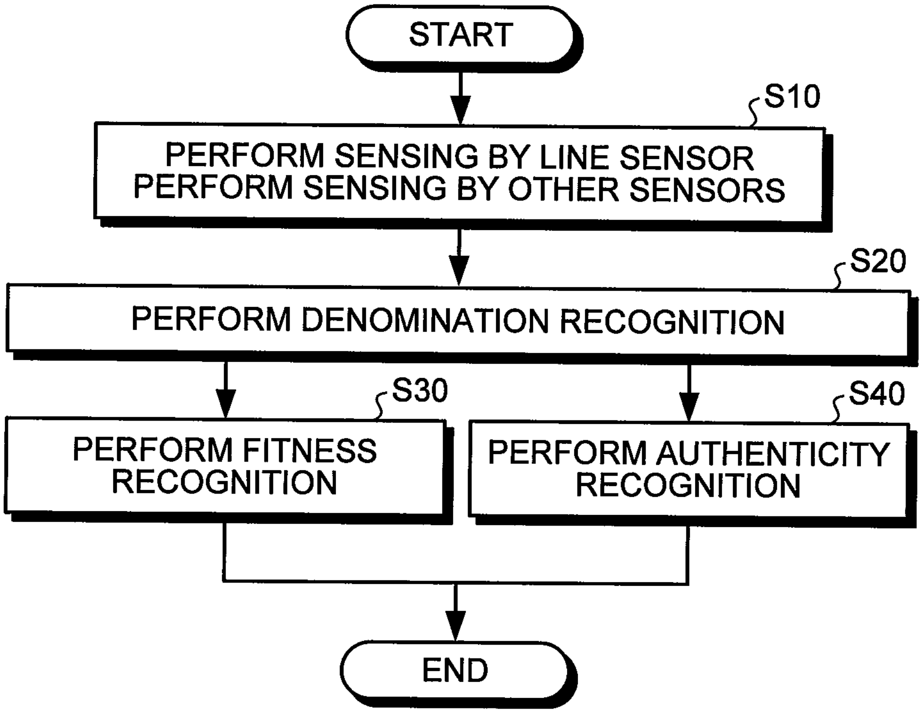
FIG. 4A is a flowchart of a process procedure of recognition processes performed by the banknote recognition apparatus according to the present embodiment.

The processes performed by the banknote recognition apparatus according to the present embodiment having a structure as described above are explained with reference to FIG. 4A. FIG. 4A is a flowchart of a process procedure of the recognition processes performed by the banknote recognition apparatus according to the present embodiment. First, the image data of the banknote is acquired by sensing performed by the image line sensor 100. After sensing is performed by the image line sensor 100, sensing is performed by the other sensors, and information is acquired from each of the sensors (Step S10).

The denomination recognition unit 30 performs recognition of the denomination of the banknote based on the image data of the banknote acquired from the line sensor 11 (Step S20). Specifically, the denomination recognition unit 30 performs recognition (identification) of the banknote by performing matching of the image data of the banknote acquired from the line sensor 11 and the reference data (data that serves as a reference for each denomination of the banknote) that is held in the denomination recognition unit 30.

The denomination recognition unit 30 performs the denomination recognition processes based on features, such as a length and a width of the banknote and a picture or a number printed on the banknote, using the image data of the banknote acquired from the line sensor 11. The denomination recognition unit 30 recognizes the denomination of the banknote by performing these processes. The recognition results obtained from the denomination recognition processes are stored in the denomination recognition unit 30. The features that are used in the recognition in the denomination recognition process are not limited to those mentioned above, and can be changed appropriately according to the type of the object that is to be recognized.

After the denomination recognition process ends, the fitness recognition unit 40 performs the fitness recognition process for recognizing the fitness of the banknote (Step S30). The fitness recognition unit 40 performs a part of the fitness recognition process by using data acquired from the line sensor system. The fitness recognition process performed by using the data acquired by the line sensor system is the fitness recognition process performed by using the image data of the banknote acquired by the line sensor 11, and is used for performing recognition of an unfit note by detecting, for example, soiling, tears, loss of part of the banknote, soiling due to scribbling, etc.

Figure 5:
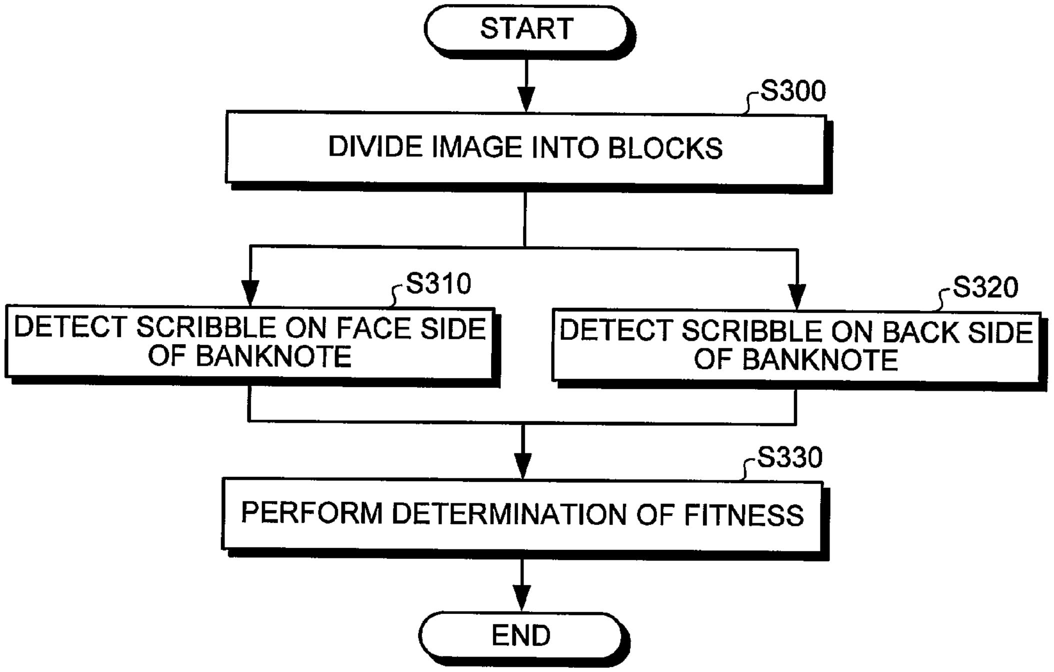
FIG. 5 is a flowchart of a process procedure of the first fitness recognition process performed by the banknote recognition apparatus according to the present embodiment.
Figure 6:
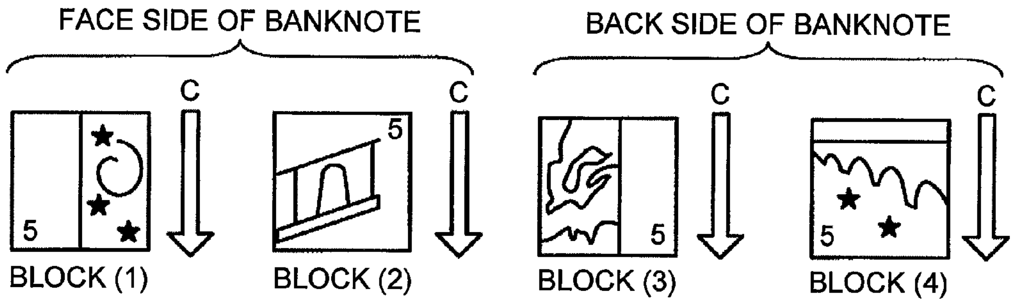
FIG. 6 is a flowchart for explaining a process procedure of the first fitness recognition process performed by the banknote recognition apparatus according to the present embodiment.

The fitness recognition process performed by using the data acquired from the line sensor system is explained next with reference to FIGS. 5 and 6. FIG. 5 is a flowchart of a process procedure of fitness recognition for scribbling performed in the fitness recognition process. FIG. 6 is a drawing for explaining a process procedure of the fitness recognition process. The image data of the banknote acquired by the line sensor 11 is first divided substantially equally into a predetermined number of blocks (Step S300).

Image data of the banknote are divided into blocks as to both face side and back side. In FIG. 6, an example in which the acquired image data of the banknote is divided into approximately two equal blocks, a block (1) and a block (2) representing the face side of the banknote, and a block (3) and a block (4) representing the back side of the banknote.

Scribbling detection is performed from an upper edge of the block-divided image data of the face side of the banknote (Step S310). Similarly, the scribbling detection is performed from an upper edge of the block-divided image data of the back side of the banknote (Step S320). For example, in FIG. 6, the fitness recognition unit 40 performs the scribbling detection on the divided image data from the upper edge in a direction of an arrow C. In the scribbling detection process, detection of scribbling is performed simultaneously on the blocks (1) to (4) by a concurrent (simultaneous parallel) process and a pipeline process. The fitness recognition unit 40 performs fitness recognition based on a scribbling detection result obtained from the block-divided image data of the face side and back side of the banknote (Step S330).

Returning to FIG. 4A, after the denomination recognition process ends, the fitness recognition unit 40 performs another part of the fitness recognition process for performing the recognition of the fitness of the banknote by using data acquired from the sensors other than the line sensor 11. For example, the fitness recognition unit 40 performs recognition of presence or absence of a tape stuck to the banknote, etc., based on the thickness sensor information. The fitness recognition process can be performed by using the data acquired from the sensors other than the line sensor 11 in parallel with the denomination recognition process.

After the denomination recognition process ends, the authenticity recognition unit 50 performs the authenticity recognition process for recognizing the authenticity of the banknote (Step S40). The authenticity recognition unit 50 performs a part of the authenticity recognition process by using the data acquired from the line sensor system in parallel with the fitness recognition process performed by using the data acquired from the line sensor system described above. The authenticity recognition process performed by using the data acquired from the line sensor system is the authenticity recognition process performed by using the image data of the banknote acquired from the line sensor 11, and is used for performing recognition of the authenticity of the banknote based on the serial number printed on the banknote.

Figure 7:
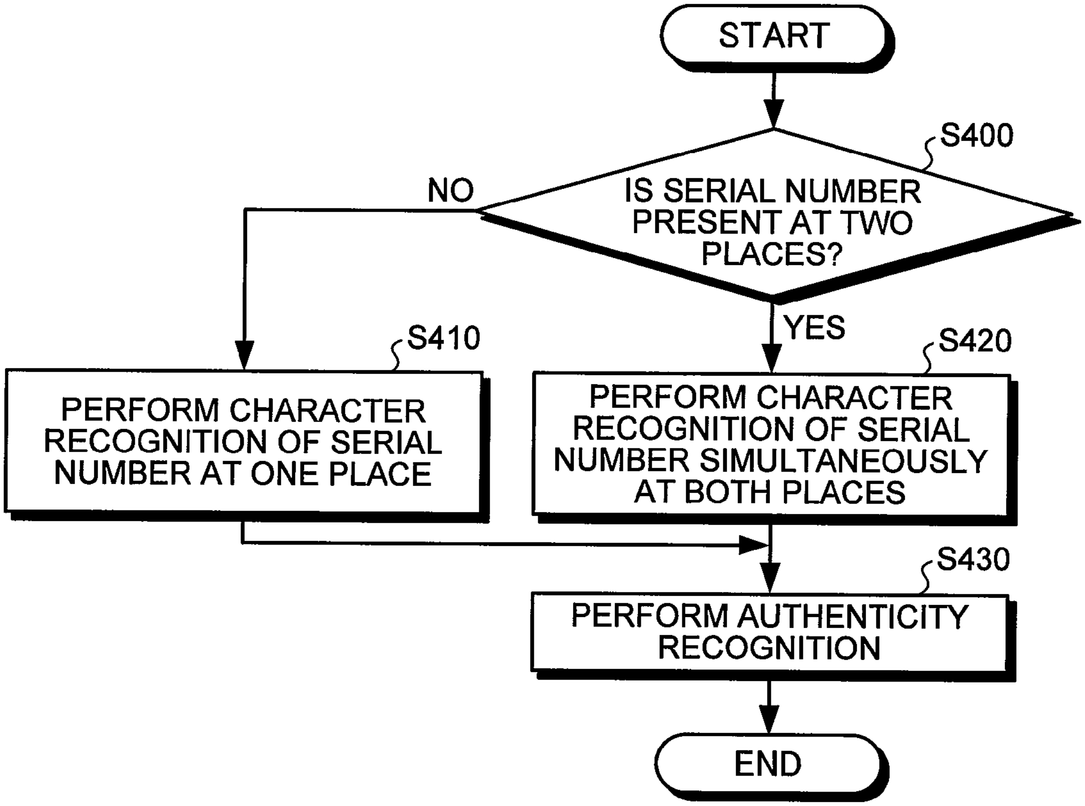
FIG. 7 is a flowchart of a process procedure of the authenticity recognition process of a banknote based on a serial number performed by the banknote recognition apparatus according to the present embodiment.
Figure 8:
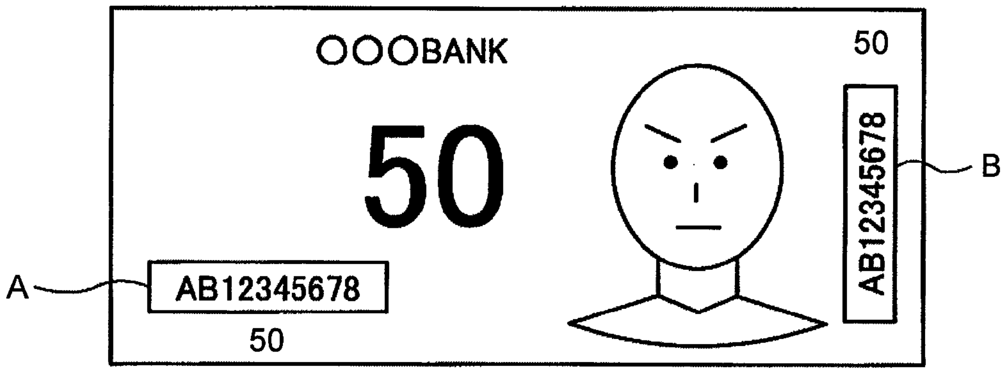
FIG. 8 is a flowchart for explaining a process procedure of the first authenticity recognition process performed by the banknote recognition apparatus according to the present embodiment.
Figure 9:
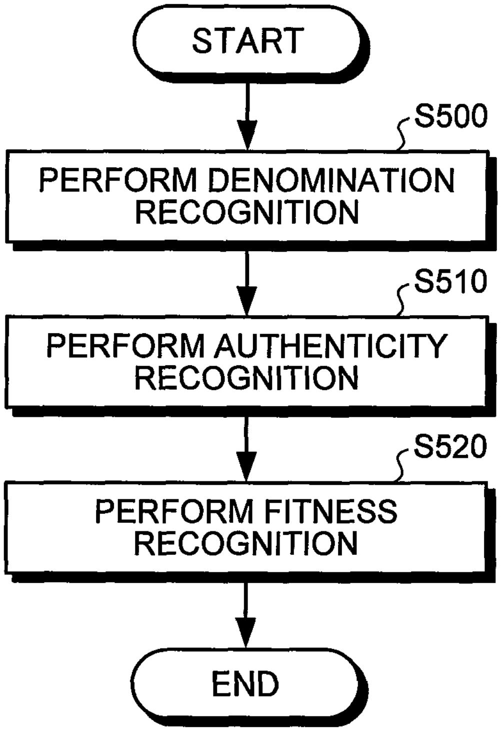
FIG. 9 is a flowchart of conventional recognition processes performed for recognition of a denomination, authenticity, and fitness.

The recognition process of the authenticity of the banknote based on the serial number is explained next with reference to FIGS. 7 and 8. FIG. 7 is a flowchart of a process procedure of the authenticity recognition process of the banknote that is based on the serial number. FIG. 8 is a drawing for explaining a process procedure of the authenticity recognition process.

First, the authenticity recognition unit 50 checks predetermined points of the image data of the banknote acquired from the line sensor 11 to recognize whether the serial numbers are present at two places (Step S400). The number of serial number and locations thereof on the banknote are identified in the denomination recognition process. For example, in the example shown in FIG. 8, the authenticity recognition unit 50 checks the points of an area A and an area B and recognizes whether the serial number is printed at two places.

If the serial number is not detected at two places (No at Step S400), that is, if the serial number is detected only at one place, the authenticity recognition unit 50 performs character recognition of the serial number at the detected place (Step S410). Character recognition of the serial number can be performed, for example, by a character recognition method using concentration gradient. A serial number recognition result obtained from character recognition is stored in the authenticity recognition unit 50.

If the serial number is detected at two places (Yes at Step S400), the authenticity recognition unit 50 performs character recognition of the serial number at both the places simultaneously by the pipeline process (Step S420). For example, in the example shown in FIG. 8, the authenticity recognition unit 50 performs character recognition of the serial number detected at the two places of the area A and the area B. The serial number recognition result obtained from character recognition is stored in the authenticity recognition unit 50.

The authenticity recognition unit 50 recognizes the authenticity of the banknote by checking the serial number recognition result stored in the authenticity recognition unit 50 (Step S430). That is, the authenticity recognition unit 50 recognizes the authenticity of the banknote by checking whether the serial number at the two places match, by matching of the serial number with that of a counterfeit bill, etc.

After the denomination recognition process ends, the authenticity recognition unit 50 performs another part of the authenticity recognition process of the banknote by using the data acquired from the sensors other than the line sensor 11 in parallel with the fitness recognition process described above. In this authenticity recognition process, the recognition of the authenticity of the banknote is performed based on, for example, the UV sensor information or the magnetic sensor information. Alternatively, the authenticity recognition process performed by using the data acquired from the sensors other than the line sensor 11 can be performed in parallel with the denomination recognition process or the fitness recognition process performed by using the data acquired from the sensors other than the line sensor 11.

As a result of completion of the fitness and authenticity recognition process (Step S30, Step S40), the fitness recognition and the authenticity recognition of the banknote end along with the denomination recognition of the banknote.

In the above description, the denomination recognition process performed by the denomination recognition unit 30 is a single-stage process; however, the denomination recognition process can be a two-stage process. That is, the denomination recognition process can be divided into the first denomination recognition process and the second denomination recognition process.

Furthermore, in the above description, the fitness recognition process and the authenticity recognition process are both single-stage processes; however, each of the fitness recognition process and the authenticity recognition process can be a two-stage process. That is, the fitness recognition process can be divided into the first fitness recognition process and the second fitness recognition process, and the authenticity recognition process can be divided into the first authenticity recognition process and the second authenticity recognition process.

Figure 4B:
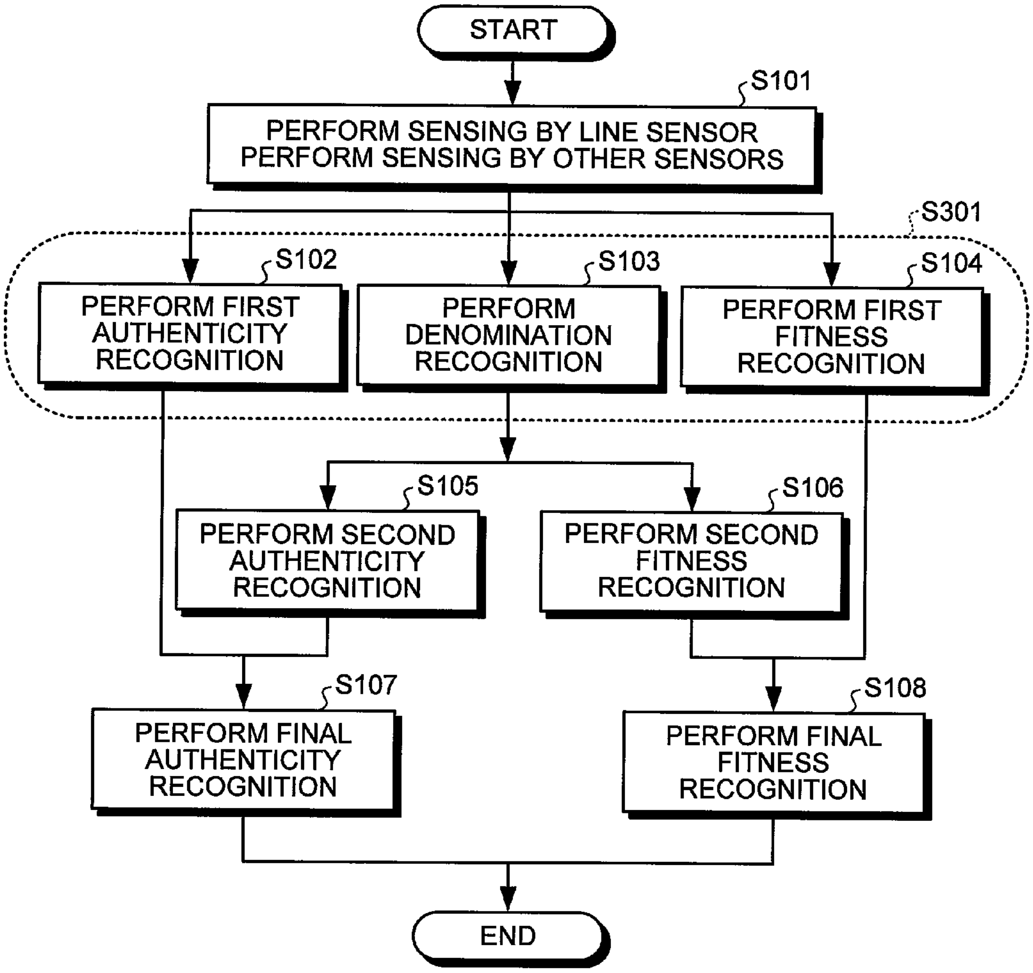
FIG. 4B is a flowchart of another process procedure of the recognition processes performed by the banknote recognition apparatus according to the present embodiment.

A case in which each of the fitness recognition process and the authenticity recognition process is divided into two stages is explained with reference to FIG. 4B. FIG. 4B is a flowchart of another process procedure of the recognition processes performed by the banknote recognition apparatus according to the present embodiment.

As shown in FIG. 4B, the image data of the banknote is acquired by the sensing performed by the line sensor 11. After sensing is performed by the line sensor 11, sensing is performed by the other sensors, and information is acquired from each of the sensors (Step S101).

The authenticity recognition unit 50 then performs the first authenticity recognition process, as a part of the authenticity recognition process for recognizing the authenticity of the banknote, which is the recognition process performed by using the image data acquired from the line sensor 11 (Step S102).

The denomination recognition unit 30 performs the denomination recognition process for recognizing the denomination of the banknote, based on the image data of the banknote acquired from the line sensor 11, in parallel with the first authenticity recognition process described above (Step S103).

Furthermore, the fitness recognition unit 40 performs the first fitness recognition process, as a part of the fitness recognition process for recognizing the fitness of the banknote, which is the recognition process performed by using the image data of the banknote acquired from the line sensor 11, in parallel with the first authenticity recognition process and the denomination recognition process described above (Step S104).

In the above description, among process steps of the first authenticity recognition process, the denomination recognition process, and the first fitness recognition process (refer to (301) of FIG. 4B), all the processes are performed in parallel. However, among the three processes shown in (301) of FIG. 4B, a part of each of the two or three processes can be performed in parallel.

After the denomination recognition process ends, the authenticity recognition unit 50 performs the second authenticity recognition process as another part of the authenticity recognition process for recognizing the authenticity of the banknote, which is the recognition process performed by using the data acquired from the sensors other than the line sensor 11 (Step S105).

Furthermore, after the denomination recognition process ends, the fitness recognition unit 40 performs the second fitness recognition process as another part of the fitness recognition process for recognizing the fitness of the banknote, which is the recognition process performed by using the data acquired from the sensors other than the line sensor 11, in parallel with the second authenticity recognition process (Step S106).

When the first authenticity recognition process and the second authenticity recognition process end, the authenticity recognition unit 50 performs a final authenticity recognition process as a conclusive authenticity recognition, based on the recognition results obtained from the first authenticity recognition process and the second authenticity recognition process (Step S107).

When the first fitness recognition process and the second fitness recognition process end, the fitness recognition unit 40 performs a final fitness recognition process as a conclusive fitness recognition, based on the recognition results obtained from the first fitness recognition process and the second fitness recognition process (Step S108).

As a result of completion of completion of the final authenticity and final fitness recognition process (Step S107, Step S108) end, the fitness recognition and the authenticity recognition of the banknote end along with the denomination recognition of the banknote. The final fitness recognition process and the final authenticity recognition process can be concurrent processes.

In the above description, out of the process steps of the second authenticity recognition process and the second fitness recognition process, both the processes can be performed in parallel; alternatively, only a part of each of the two processes can be performed in parallel.

In the above description, the denomination recognition process performed by the denomination recognition unit 30 is a single-stage process; however, the denomination recognition process can be a two-stage process. For example, the denomination recognition process can be divided into the first denomination recognition process and the second denomination recognition process.

Furthermore, in the above description, the first authenticity recognition process is performed by using the image data of the banknote acquired from the line sensor 11, and the second authenticity recognition process is performed by using the data acquired from the sensors other than the line sensor 11.

However, the first authenticity recognition process can be performed by using the data acquired from the sensors other than the line sensor 11, and the second authenticity recognition process can be performed by using the image data of the banknote acquired from the line sensor 11.

Furthermore, in the above description, the first fitness recognition process is performed by using the image data of the banknote acquired from the line sensor 11, and the second fitness recognition process is performed by using the data acquired from the sensors other than the line sensor 11.

However, the first fitness recognition process can be performed by using the data acquired from the sensors other than the line sensor 11, and the second fitness recognition process can be performed by using the image data of the banknote acquired from the line sensor 11.

Figure 4C:
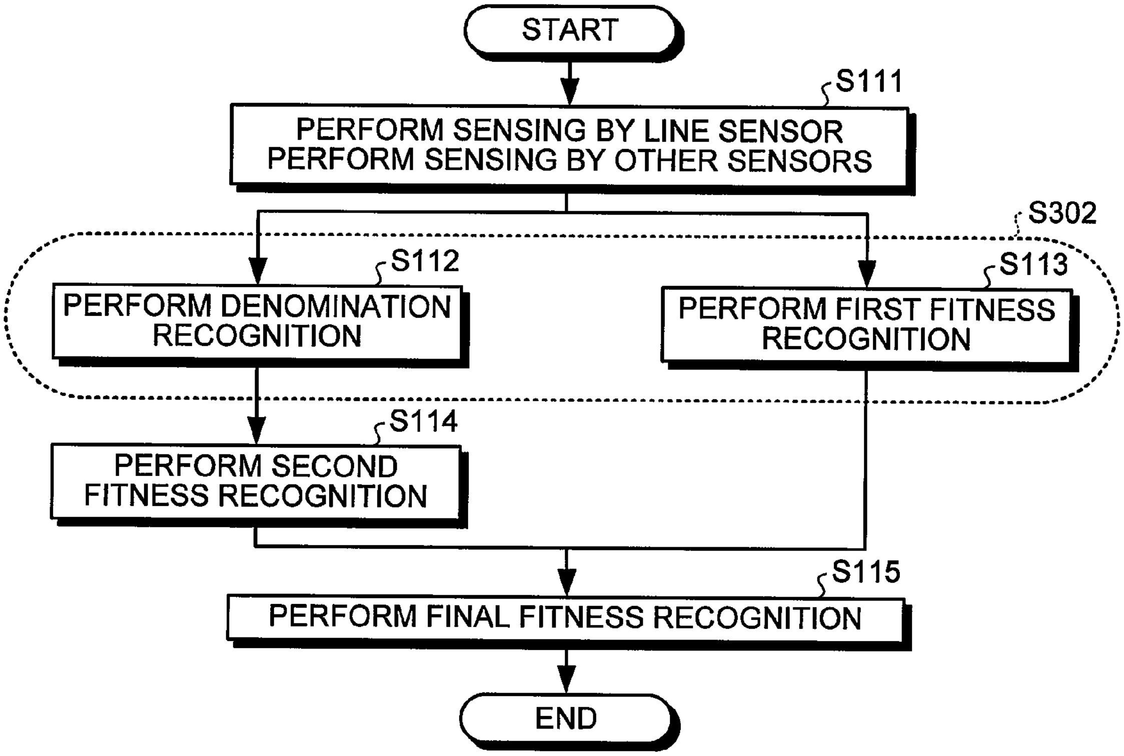
FIG. 4C is a flowchart of still another process procedure of the recognition processes performed by the banknote recognition apparatus according to the present embodiment.

A case in which the denomination recognition process and the fitness recognition process are performed in parallel is explained next with reference to FIG. 4C. FIG. 4C is a flowchart of still another process procedure of the recognition processes performed by the banknote recognition apparatus according to the present embodiment.

As shown in FIG. 4C, the image data of the banknote is acquired by the sensing performed by the line sensor 11. After sensing is performed by the line sensor 11, sensing is performed by the other sensors, and information is acquired from each of the sensors (Step S111).

The denomination recognition unit 30 then performs the denomination recognition process for recognizing the denomination of the banknote based on the image data of the banknote acquired from the line sensor 11 (Step S112).

Furthermore, the fitness recognition unit 40 performs, the first fitness recognition process, as a part of the fitness recognition process for recognizing the fitness of the banknote, which is the recognition process performed by using the image data of the banknote acquired from the line sensor 11, in parallel with the denomination recognition process described above (Step S113).

In the above description, out of the process steps of the denomination recognition process and the first fitness recognition process (refer to (302) of FIG. 4C), both the processes can be performed in parallel; alternatively, only a part of each of the two processes can be performed in parallel.

After the denomination recognition process ends, the fitness recognition unit 40 performs the second fitness recognition process, as another part of the fitness recognition process for recognizing the fitness of the banknote, which is the recognition process performed by using the data acquired from the sensors other than the line sensor 11 (Step S114). The first fitness recognition process and the second fitness recognition process can be performed in parallel.

When the first fitness recognition process and the second fitness recognition process end, the fitness recognition unit 40 performs the final fitness recognition process as a conclusive fitness recognition, based on the recognition results obtained from the first and the second fitness recognition processes (Step S115).

As a result of completion of completion of the final fitness (Step S115), the fitness recognition of the banknote ends along with the denomination recognition of the banknote.

In the above description, the denomination recognition process performed by the denomination recognition unit 30 is a single-stage process; however, the denomination recognition process can be a two-stage process. For example, the denomination recognition process can be divided into the first denomination recognition process and the second denomination recognition process. Either of the processes of the first denomination recognition process or the second denomination recognition process can be performed in parallel with the first fitness recognition process.

Furthermore, in the above description, the first fitness recognition process is performed by using the image data of the banknote acquired from the line sensor 11, and the second fitness recognition process is performed by using the data acquired from the sensors other than the line sensor 11.

However, the first fitness recognition process can be performed by using the data acquired from the sensors other than the line sensor 11, and the second fitness recognition process can be performed by using the image data of the banknote acquired from the line sensor 11.

Figure 4D:
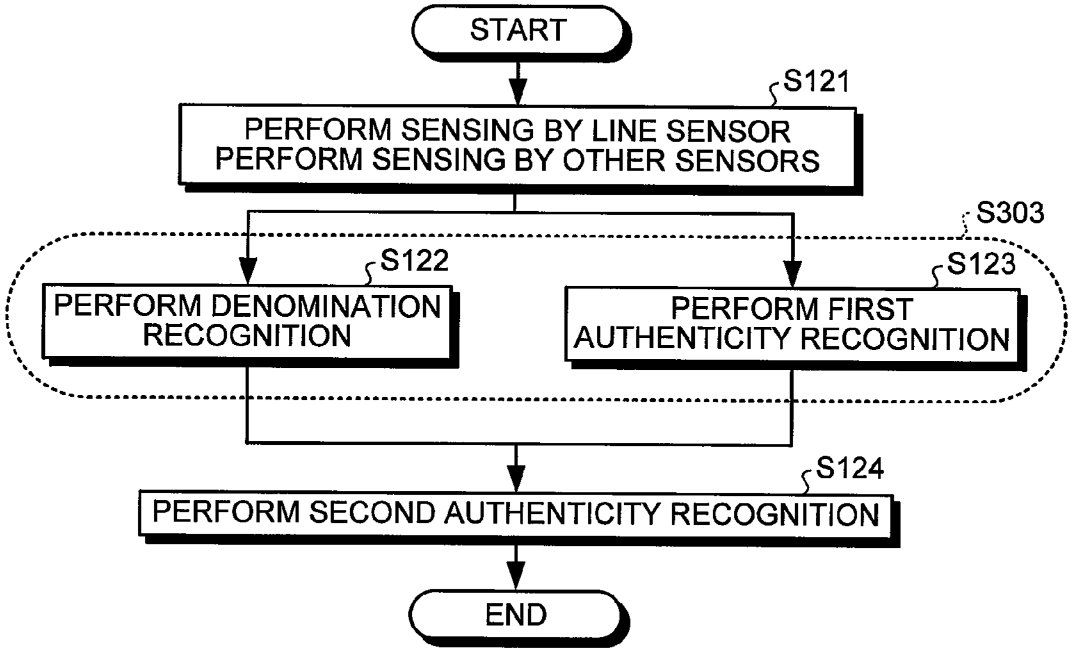
FIG. 4D is a flowchart of still another process procedure of the recognition processes performed by the banknote recognition apparatus according to the present embodiment.

A case in which the denomination recognition process and the authenticity recognition process are performed in parallel is explained next with reference to FIG. 4D. FIG. 4D is a flowchart of still another process procedure of the recognition processes performed by the banknote recognition apparatus according to the present embodiment.

As shown in FIG. 4D, the image data of the banknote is acquired by the sensing performed by the line sensor 11. After sensing is performed by the line sensor 11, sensing is performed by the other sensors, and information is acquired from each of the sensors (Step S121).

The denomination recognition unit 30 then performs the denomination recognition process for recognizing the denomination of the banknote based on the image data of the banknote acquired from the line sensor 11 (Step S122).

Furthermore, the authenticity recognition unit 50 performs the first authenticity recognition process as a part of the authenticity recognition process for recognizing the authenticity of the banknote, which is the recognition process performed by using the image data of the banknote acquired from the line sensor 11, in parallel with the denomination recognition process described above (Step S123).

In the above description, out of the process steps of the denomination recognition process and the first authenticity recognition process (refer to (303) of FIG. 4D), both the processes can be performed in parallel; alternatively, only a part of the two processes can be performed in parallel.

After the denomination recognition process ends, the authenticity recognition unit 50 performs, as another part of the authenticity recognition process for recognizing the authenticity of the banknote, the second authenticity recognition process by using the data acquired from the sensors other than the line sensor 11 (Step S124). The first authenticity recognition process and the second authenticity recognition process can be performed in parallel. As a result of completion of the second authenticity recognition process, the authenticity recognition of the banknote ends along with the denomination recognition of the banknote.

In the above description, the denomination recognition process performed by the denomination recognition unit 30 is a single-stage process; however, the denomination recognition process can be a two-stage process. For example, the denomination recognition process can be divided into the first denomination recognition process and the second denomination recognition process. Either of the processes of the first denomination recognition process or the second denomination recognition process can be performed in parallel with the first authenticity recognition process or the second authenticity recognition process.

Furthermore, in the above description, the first authenticity recognition process is performed by using the image data of the banknote acquired from the line sensor 11, and the second authenticity recognition process is performed by using the data acquired from the sensors other than the line sensor 11.

However, the first authenticity recognition process can be performed by using the data acquired from the sensors other than the line sensor 11, and the second authenticity recognition process can be performed by using the image data of the banknote acquired from the line sensor 11.

Figure 4E:
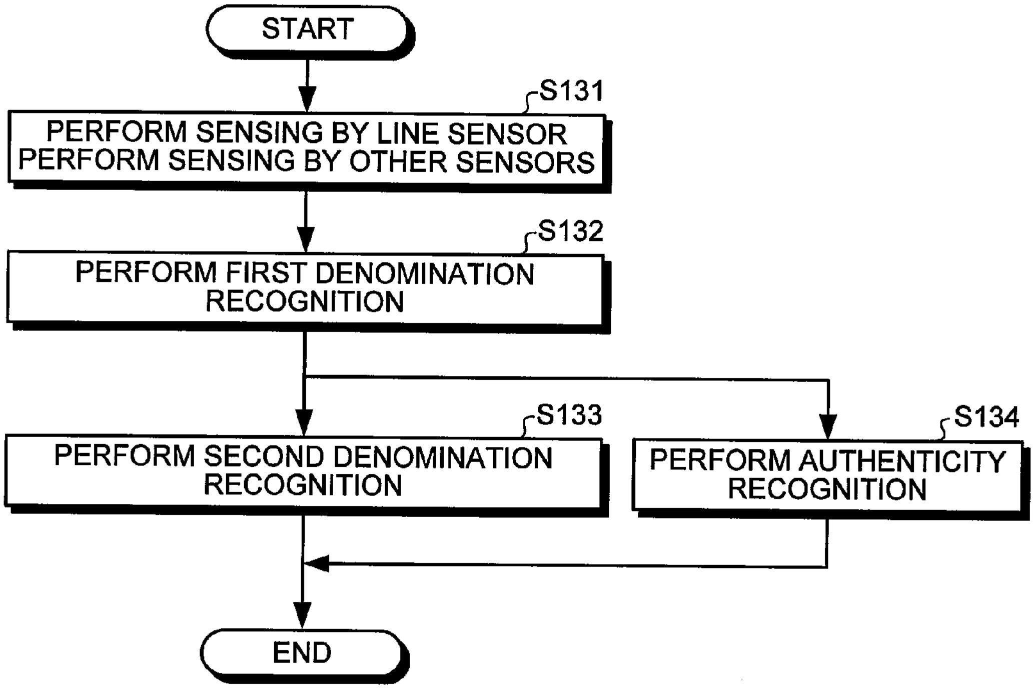
FIG. 4E is a flowchart of still another process procedure of the recognition processes performed by the banknote recognition apparatus according to the present embodiment.

A case in which the denomination recognition process is divided into two stages is explained next with reference to FIG. 4E. FIG. 4E is a flowchart of still another process procedure of the recognition processes performed by the banknote recognition apparatus according to the present embodiment.

As shown in FIG. 4E, the image data of the banknote is acquired by the sensing performed by the line sensor 11. After sensing is performed by the line sensor 11, sensing is performed by the other sensors, and information is acquired from each of the sensors (Step S131).

The denomination recognition unit 30 then performs the first denomination recognition process (Step S132). The first denomination recognition process is a recognition process performed based on, for example, the features, such as the length, the width, and a color, of the banknote by using the image data of the banknote acquired from each type of the sensors; it is not a complete denomination recognition process but one in which recognition of the denomination can be performed to a certain degree. Because the denomination can be narrowed to a certain degree by the first denomination recognition process, a load on the subsequent second denomination recognition process can be reduced, and the process can be performed efficiently. A recognition result obtained from the first denomination recognition process is stored in the denomination recognition unit 30.

After the first denomination recognition process ends, the denomination recognition unit 30 performs the second denomination recognition process (Step S133). The second denomination recognition process is a recognition process performed based on, for example, the features, such as the picture and numbers printed on the banknote, by using the image data of the banknote acquired from each type of the sensors. The second denomination recognition process is a more detailed recognition process than the first denomination recognition process. The recognition result obtained from the second denomination recognition process is stored in the denomination recognition unit 30. Only the recognition result obtained from the first denomination recognition (for example, a number of possible denominations) can be used for performing the second denomination recognition process; alternatively, the recognition result can be reflected as weights.

The features that are used in the recognition in the denomination recognition process are not limited to those mentioned above, and can be changed appropriately according the type of the object that is to be recognized.

After the first denomination recognition process ends, the authenticity recognition unit 50 performs the authenticity recognition process for recognizing the authenticity of the banknote (Step S134). The second denomination recognition process and the authenticity recognition process can be performed in parallel.

When the second denomination recognition process and the authenticity recognition process end, the authenticity recognition unit 50 performs a conclusive authenticity recognition based on the recognition results of the second denomination recognition process and the authenticity recognition process, after which the authenticity recognition of the banknote ends along with the denomination recognition of the banknote.

In the above-described embodiment, the denomination recognition process is performed by using the image data of the banknote acquired from the line sensor 11. However, the denomination recognition process is not limited thus. For example, a width sensor that detects the width of the banknote being independent of the line sensor or a color sensor that detects the color of the banknote independently of the line sensor can be used, and the denomination recognition process can be performed based on detection results obtained from these sensors.

In the above embodiment, each of the denomination recognition process, the fitness recognition process, and the authenticity recognition process is either a single-stage process or a two-stage process. However, each of the recognition processes can be subdivided into two or more stages. The recognition processes subdivided in this manner or a part of each of the processes can be performed in parallel.

According to the present embodiment, each of the denomination recognition process and the authenticity recognition process is divided into two stages, the second denomination recognition is performed based on the results of the first denomination recognition and the first authenticity recognition. And thereafter, the second authenticity recognition, which is a more detailed recognition of the authenticity of the banknote, is performed. Consequently, the banknote that is recognized to be counterfeit in the first authenticity recognition process is eliminated at that very instant. Because the counterfeit banknote is not subjected to further processing, the overall time required for the recognition process can be reduced, the process can be performed efficiently, and the recognition process can be speeded up. After the recognition of the authenticity in the first authenticity recognition process, a more detailed recognition of the authenticity of the banknote is performed in the second authenticity recognition process. Consequently, the authenticity recognition process can be performed with high accuracy and excellent reliability.

According to the present embodiment explained above, the authenticity recognition unit and the fitness recognition unit in parallel perform authenticity recognition and fitness recognition, respectively, on the banknote. Consequently, recognition of the authenticity and the fitness of the banknote can be performed efficiently in a short time.

Furthermore, according to the present embodiment, before the concurrent authenticity recognition process and the fitness recognition process are performed as to the banknote, if the denomination recognition unit identifies the denomination of the banknote, recognition of the authenticity and fitness of the banknote can be performed more efficiently in a short time, because the authenticity recognition process and the fitness recognition process are performed on a banknote whose denomination has been recognized.

Furthermore, according to the present embodiment, if a part of the fitness recognition process on the banknote is performed in parallel with the denomination recognition process, recognition of the authenticity and the fitness of the banknote can be performed more efficiently in a short time.

Furthermore, according to the present embodiment, the processes are categorized into those performed by the line sensor and those performed by the other sensors, and the recognition of the banknote is performed by performing these processes in parallel. Consequently, recognition of the authenticity and fitness of the banknote can be performed efficiently in a short time.

Furthermore, according to the present embodiment, each of the denomination recognition process and the authenticity recognition process is divided into two stages, the second denomination recognition is performed based on the results of the first denomination recognition and the first authenticity recognition, and thereafter, the second authenticity recognition, which is a more detailed recognition of the authenticity of the banknote, is performed. Consequently, the banknote that is recognized as a counterfeit in the first authenticity recognition process is eliminated at that very instant. Because the counterfeit banknote is not subjected to further processing, the overall time required for the recognition process can be reduced, the process can be performed efficiently, and the recognition process can be speeded up. After the recognition of the authenticity in the first authenticity recognition process, a more detailed recognition of the authenticity of the banknote is performed in the second authenticity recognition process. Consequently, the authenticity recognition process can be performed with high accuracy and excellent reliability.

Industrial Applicability

As explained above, the paper sheet recognition apparatus according to the present invention is useful for efficiently performing recognition of the paper sheet provided with a large number of kinds of features, and is particularly useful for performing recognition of the banknote.

EXPLANATIONS OF LETTERS OR NUMERALS

1: Banknote recognition apparatus
11: Line sensor
21: Magnetic sensor
22: Thickness sensor
23: UV sensor
30: Denomination recognition unit
40: Fitness recognition unit
50: Authenticity recognition unit
60: Recognition unit
61: CPU(1)
62: CPU(2)
63: CPU(3)
64: FPGA(1)
65: FPGA(2)
66: ROM
67: RAM
100: Image line sensor
110: Light emitting unit
111: Array
112: Rod lens
120: Light emitting and photodetecting unit
121: Array
123: Photodiode array
124: Multiplexer circuit
200: Image line sensor
210: First line sensor
211: Reflective light source
212: Lens
213: Light receiving unit
214: A/D converter
215: Blocking unit
220: Second line sensor
221: Transmissive light source
222: Reflective light source
223: Lens
224: Light receiving unit
225: A/D converter
226: Blocking unit
300: Banknote

The invention claimed is:

1. A banknote recognition apparatus that performs recognition of a banknote, comprising:
- an image acquiring unit that acquires an image of the banknote;
- a feature information acquiring unit that acquires feature information that is information relating to a feature at a specific position of the banknote;
- a banknote information acquiring unit that acquires, from the image acquiring unit and the feature information acquiring unit, banknote information that is information-relating to the banknote;

a type recognition unit that performs recognition of a denomination and orientation of the banknote based on the banknote information and outputs the denomination and the orientation of the banknote as type recognition results;

a fitness recognition unit that performs recognition of fitness of the banknote based on the banknote information and reference data including permissible range of the banknote information, the reference data are categorized denomination-wise and orientation-wise; and an authenticity recognition unit that performs recognition of authenticity of the banknote based on the banknote information, wherein a fitness recognition process performed by the fitness recognition unit includes a plurality of fitness recognition processes, at least one of the plurality of fitness recognition processes is performed without the reference data as a first fitness recognition process in parallel with a type recognition process performed by the type recognition unit, and the rest of the plurality of the fitness recognition processes using the reference data corresponding to the output from the type recognition unit as a second fitness recognition process is performed in parallel with the authenticity recognition process performed by the authenticity recognition unit.

2. The banknote recognition apparatus according to claim 1, wherein the image acquiring unit generates an image by using an optical line sensor and the feature information acquiring unit acquires the information from a sensor other than the optical line sensor.

3. The banknote recognition apparatus according to claim 1, wherein the first fitness recognition process is performed based on the feature information acquired by the feature information acquiring unit, and the second fitness recognition processes are performed based on the image acquired by the image acquiring unit.

4. The banknote recognition apparatus according to claim 3, wherein the images relating to soiling, tears or scribbles, and the feature information acquired by a thickness sensor are used for the second fitness recognition processes, and the images relating to a serial number of the banknote and the information acquired by at least one of a UV sensor and a magnetic sensor are used for the plurality of authenticity recognition processes.

5. A banknote recognition method for performing recognition of a banknote, comprising:

acquiring banknote information including an image of the banknote acquired by an image acquiring unit and a feature information relating to a feature at a specific position of the banknote acquired by a feature information acquiring unit;

recognizing a type of the banknote, based on the banknote information, by a type recognition unit;

recognizing fitness of the banknote, based on the banknote information, by a fitness recognition unit and recognizing authenticity of the banknote, based on the banknote information, by an authenticity recognition unit;

wherein the recognizing of the fitness of the banknote includes a first fitness recognition process that is performed regardless of the type of the banknote and a second fitness recognition process that is performed based on the type of the banknote, the first fitness recognition process is performed in parallel with the recognizing of the type of the banknote, and the second fitness recognition process is performed in parallel with the recognizing of the authenticity of the banknote based on the type of the banknote recognized in the recognizing of the type of the banknote.

6. A banknote recognition apparatus that performs recognition of a banknote, comprising:

an imaging acquiring unit that acquires an image of the banknote;

a feature information acquiring unit that acquires feature information that is information relating to a feature at a specific position of the banknote;

a banknote information acquiring unit that acquires banknote information that is information generated from the image acquiring unit and the feature information acquiring unit;

a type recognition unit that performs recognition of a denomination and orientation of the banknote based on the banknote information;

a fitness recognition unit that performs recognition process of fitness of the banknote based on the banknote information and reference data including permissible range of the banknote information, the reference data are categorized denomination-wise and orientation-wise; and an authenticity recognition unit that performs recognition process of authenticity of the banknote based on the banknote information, wherein the recognition process of fitness performed by the fitness recognition unit includes a plurality of fitness recognition processes, a part of the plurality of fitness recognition processes requires information of denomination and orientation of the banknote and the others of the plurality of fitness recognition processes requires no information of the denomination and the orientation of the banknote, the recognition process of authenticity performed by the authenticity recognition unit includes a plurality of authenticity recognition processes, a part of the plurality of authenticity recognition processes requires the information of the denomination and the orientation of the banknote and the others of the plurality of authenticity recognition processes requires no information of the denomination and the orientation of the banknote, at least one of the plurality of the fitness recognition processes requiring no information of the denomination and the orientation of the banknote is performed in parallel with a part of the authenticity recognition processes requiring no information of the denomination and the orientation of the banknote and the type recognition process, and the rest of the plurality of the fitness recognition processes requiring the information of the denomination and the orientation of the banknote is performed in parallel with the authenticity recognition process requiring the information of denomination and orientation of the banknote.

7. The banknote recognition apparatus according to claim 6, wherein at least one of the plurality of fitness recognition processes is performed based on the image acquired by the image acquiring unit, and at least one of the plurality of fitness recognition processes is performed based on the feature information acquired by the feature information acquiring unit.

8. The banknote recognition apparatus according to claim 7, wherein the images relating to soiling, tears or scribbles, and the feature information acquired by a thickness sensor are used for the plurality of fitness recognition processes, and the images relating to a serial number of the banknote and the information acquired by at least one of a UV sensor and a magnetic sensor are used for the plurality of authenticity recognition processes.

* * * * *